United States Patent
Stewart

(10) Patent No.: US 8,654,703 B2
(45) Date of Patent: Feb. 18, 2014

(54) TELEPHONE CALL PROCESSING

(75) Inventor: Mark Norman Stewart, Middlesex (GB)

(73) Assignee: Metaswitch Networks Ltd, Enfield (GB)

( * ) Notice: Subject to any disclaimer, the term of this patent is extended or adjusted under 35 U.S.C. 154(b) by 757 days.

(21) Appl. No.: 12/560,311

(22) Filed: Sep. 15, 2009

(65) Prior Publication Data

US 2010/0098057 A1    Apr. 22, 2010

(30) Foreign Application Priority Data

Sep. 15, 2008    (GB) .................................. 0816850.2

(51) Int. Cl.
*H04W 4/00* (2009.01)
*H04L 12/66* (2006.01)
*H04M 3/42* (2006.01)

(52) U.S. Cl.
USPC ....................... 370/328; 370/356; 379/201.02

(58) Field of Classification Search
None
See application file for complete search history.

(56) References Cited

U.S. PATENT DOCUMENTS

| | | | |
|---|---|---|---|
| 6,370,394 B1 * | 4/2002 | Anttila | 455/417 |
| 6,718,026 B1 * | 4/2004 | Pershan et al. | 379/211.01 |
| 6,996,076 B1 * | 2/2006 | Forbes et al. | 370/310 |
| 7,599,351 B2 * | 10/2009 | Gallant et al. | 370/352 |

* cited by examiner

*Primary Examiner* — Melanie Jagannathan
(74) *Attorney, Agent, or Firm* — EIP US LLP

(57) ABSTRACT

Embodiments of the invention provide methods and apparatus for providing one-telephone dialing number telephony services where only a single telephone dialing number is required for each subscriber, despite each subscriber having multiple telephony devices on which they wish to be contacted. Calls to a one-telephone dialing number telephony service subscriber may be detected at a telephone switch using one or more triggers configured in association with a device-shared telephone dialing number allocated to the subscriber. Upon receipt of a call connection request to a subscriber, control of the call is assumed, for example by redirecting the call to a service platform capable of generating multiple call connection requests. Multiple outgoing call connection requests are transmitted to multiple telephony devices, including a mobile telephone, associated with the device-shared telephone dialing number allocated to a subscriber.

28 Claims, 9 Drawing Sheets

TELEPHONE CALL PROCESSING

CROSS-REFERENCE TO RELATED APPLICATIONS

This application claims priority under 35 U.S.C. §119(a) to Great Britain Application No. 0816850.2 filed on Sep. 15, 2008, the entire disclosure of which is hereby incorporated by reference.

BACKGROUND OF THE INVENTION

1. Field of the Invention

This application relates to methods and apparatus for providing services to subscribers in a telecommunications network. In particular, but not exclusively, this application relates to the delivery of telephone calls to subscribers having multiple telephony devices.

2. Description of the Related Technology

Telephone subscribers have long had to deal with a proliferation of telephony devices through which calling parties may contact them. For example, a business user might have a fixed-line telephone for use in the office and a mobile telephone for use at other locations. Each telephony device has associated advantages; whilst a mobile telephone provides the user with mobility, a fixed-line telephone typically provides less costly call services, no need to recharge a battery, and also better service in areas where there is poor signal strength such as inside a building.

To avoid confusing calling parties with telephone dialing numbers for each of the telephony devices of a subscriber, a one-telephone dialing number telephony service allows a subscriber to publish a single telephone dialing number on which they can be contacted. Preferably, when the single telephone dialing number is called, all of the subscriber's telephony devices will typically ring, preferably simultaneously. The subscriber is thus able to answer the call at the telephony device of his choosing.

Prior art attempts to provide one-telephone dialing number telephony services typically require each physical telephony device to be assigned a unique telephone number, so are not true one-telephone dialing number services. When a subscriber's published telephone dialing number is called, the terminating telephony system providing the one-telephone dialing number service will ring each device by establishing separate call legs using each device's telephone dialing number. One disadvantage of such an approach is that since each physical telephony device has a separate telephone dialing number, calls originating from each of the devices will generally display each respective device's number as a calling line identifier (CLI). Such disclosure of each device's CLI is generally undesirable, for example it may cause confusion by presenting un-published telephone dialing numbers for the subscriber. Another disadvantage of such an approach is that additional telephone dialing numbers are required to offer the service which causes additional management overhead for the service provider and uses up more telephone dialing numbers from a limited pool of publicly available telephone dialing numbers.

Other prior art attempts to provide one-telephone dialing number telephony services can be found where the telephony devices are Session Initiation Protocol (SIP) compliant. Each SIP-compliant telephony device registers contact information, such as IP address, against a common 'address of record' which typically maps to the subscriber's telephone number. When the subscriber's number is called, the terminating telephony system sends (or 'forks') the call to each telephony device using standard procedures found in SIP. Whilst this approach avoids the need to assign each device its own telephone dialing number, it has the disadvantage that all telephony devices must support SIP (or that a protocol conversion unit is deployed which gives the appearance that a telephony device supports SIP).

It would therefore be desirable to provide a one-telephone dialing number telephony service where only a single telephone dialing number is required for each subscriber, despite each subscriber having multiple telephony devices on which they wish to be called.

SUMMARY OF CERTAIN INVENTIVE ASPECTS

In accordance with a first aspect of the present invention, there is provided a method of providing telephony services to subscribers in a telecommunications system including a mobile telephone network having a subscriber database and at least another telephone network different to the mobile telephone network, the subscribers each having a plurality of associated telephony devices including a mobile telephony device, all of the devices associated with a subscriber being contactable via a device-shared telephone dialing number, the method comprising the steps of, at a call control system:

receiving a first incoming call connection request associated with an incoming call directed to the device-shared telephone dialing number for a subscriber, the incoming call connection request having been routed to the call control system on the basis of the device-shared telephone dialing number;

assuming control of the incoming call;

transmitting a first outgoing call connection request to a first telephony device associated with the device-shared telephone dialing number, the first telephony device being located in the at least another telephone network;

transmitting a second outgoing call connection request to the mobile telephony device associated with the subscriber, the second outgoing call connection request being transmitted to the mobile telephony device based upon a location query and corresponding location response being sent to and received from the subscriber database respectively in relation to the device-shared telephone dialing number, the corresponding location response comprising a temporary routing number for the second outgoing call connection request;

receiving a call connection response from one of the first telephony device and the mobile telephony device; and connecting the incoming call to the one of the first telephony device and the mobile telephony device.

Hence, in at least one embodiment, the invention provides a solution to the one-telephone dialing number telephony service involving a combination of device types without requiring that each device is assigned a unique telephone number. The technique is particularly applicable when one of the devices is a mobile phone that obtains services from a standard circuit-switched cellular network such as Group Speciale Mobile (GSM), Universal Mobile Telecommunications Service (UMTS), Code Division Multiple Access-One (CDMAOne) or Code Division Multiple Access-2000 (CDMA2000).

Certain embodiments also provide for delivery of calls made to a subscriber's device-shared telephone dialing number to a mobile phone and one or more other telephones which may or may not be at a fixed location. These embodiments may interface with the mobile telephone network using standard interfaces, such as those described in American National Standards Institute Standard 41 (ANSI-41), and do not require entities within the mobile telephone network to provide non-standard behavior.

Embodiments of the invention may further comprise redirecting the incoming call to a service platform capable of transmitting the first and second outgoing call connection requests. Hence, the certain embodiments allow multiple outgoing call connection requests (also known as call setup requests) to be transmitted so that call connections to multiple telephony devices associated with a single subscriber may be created without the need for allocation of multiple telephone dialing numbers.

In additional embodiments, the method comprises receiving a first call routing query associated with the incoming call, in response to receipt of the first call routing query, generating a call redirect request for the call to be redirected, wherein the incoming call is redirected in response to the generated call redirect request. Hence, the call is re-routed from the network node currently responsible for routing the call. Removing control of the call from the previously responsible node allows non-standard call processing to be carried out and multiple call legs to multiple telephony devices can be created using the device-shared telephone dialing number.

In still further embodiments, the first call routing query is received from a telephone switch located in the telecommunications system, the generated call redirect request is transmitted to the telephone switch, and the call is redirected from the telephone switch. Hence, the invention provides delivery of calls made to a subscriber's device-shared telephone dialing number to multiple telephony devices, typically by acting as the local exchange switch for these telephony devices.

In other embodiments, the method comprises receiving at the telephone switch a primary call connection request associated with the incoming call directed to the device-shared telephone dialing number, wherein the first call routing query is generated by the telephone switch in response to receipt of the primary call connection request. Hence, some embodiments allow detection of calls for one-telephone dialing number telephony services at a telephone switch.

In additional embodiments, the method comprises configuring the telephone switch to generate a call routing query in response to receiving an incoming call that is directed to the device-shared telephone dialing number for the subscriber. Hence, a telephone switch may be configured to detect calls where one-telephone dialing number telephony services should be applied. Such calls may be detected using one or more triggers configured in association with the device-shared telephone dialing number of a subscriber, for example an Intelligent Network (IN) trigger, an Advanced Intelligent Network (AIN) trigger, a Wireless Intelligent Network (WIN) trigger, a Customised Applications for Mobile networks Enhanced Logic (CAMEL) trigger, an Intelligent Network Application Part (INAP), or a Local Number Portability (LNP) trigger. In an IMS environment, this may involve configuring the telephone switch with Filter Criteria such as initial Filter Criteria (iFC).

In other embodiments, the configuring of the telephone switch comprises configuring the telephone switch to contact the subscriber database for transmission data identifying where to transmit the call routing queries to. Hence, the telephone switch is able to obtain information relating to the location of the service platform in the telecommunications system from the subscriber database.

In other embodiments, the first call routing query is received by a service platform separate from the telephone switch in the telecommunications system, the generated call redirect request is transmitted from the service platform, and the incoming call is redirected to the service platform. Hence, call control for these embodiments may be carried out at a service platform in the telecommunications system. The telephone switch and other telephony devices may connect directly or indirectly to the service platform over fixed or wireless technology using protocols which include but are not limited to the Session Initiation protocol (SIP), the Media Gateway Control Protocol (MGCP) and the Gateway Control Protocol (GCP—also known as H.248 or Megaco). The service platform may include a media gateway controller, call agent or softswitch which may already exist in the telecommunications system and which can be suitably configured to implement the one-telephone dialing number telephony service of embodiments of the invention.

Embodiments of the invention may further comprise in response to the call redirection, creating a secondary call connection request directed to the device-shared telephone dialing number for the subscriber, whereby a second call routing query is generated by the telephone switch. Hence, once control of the initial call has been achieved, a further call leg to the subscriber's mobile telephone device can be created.

Embodiments of the invention may also comprise identifying the first call routing query and the second call routing query as being associated with the same device-shared telephone dialing number; and notifying the telephone switch of the identification. Hence, when attempts to create two calls in relation to a device-shared telephone dialing number are identified, normal call termination to one or more of the subscriber's telephony devices can be carried out.

In embodiments of the invention, a location query is sent to the subscriber database in response to the notification step. In other embodiments of the invention the first outgoing call connection request is transmitted to the first telephony device in response to the notification step. Hence, notification can trigger call termination to the mobile telephony device or the first telephony device.

In embodiments of the invention, the identification and notification steps are carried out at the service platform and the notification comprises instructing the telephone switch to carry out the location query and transmit the second outgoing call connection request to the mobile telephony device without generating a further call routing query. In other embodiments, the identification and notification steps are carried out at the service platform and the notification comprises instructing the telephone switch to transmit the first outgoing call connection request to the first telephony device without generating a further call routing query. Hence, notification may involve the service platform instructing the telephone switch to invoke a normal call termination procedure, i.e. request an outgoing call connection with either the mobile telephony device or the first telephony device, instead of generating a further call routing query. In alternative embodiments, the service platform may instruct the telephone switch to request outgoing call connections with both the mobile and first telephony devices.

In certain embodiments of the invention, the identification step comprises one or more of monitoring redirection information associated with the incoming call, monitoring call routing queries associated with the incoming call, monitoring incoming call connection requests associated with the incoming call, monitoring information associated with the calling party for the incoming call, and monitoring information associated with the called party for the incoming call. Hence, identification of multiple call legs related to a device-shared telephone dialing number may involve the service platform inspecting certain parameters in signalling information for the call such as where a call has been redirected from, the number of incoming call connection requests associated with the call, or the calling or called number or party for the call.

Embodiments of the invention may comprise receiving an initial call connection request associated with the incoming call directed to the device-shared telephone dialing number for the subscriber, wherein the first incoming call connection request is generated in response to receipt of the initial call connection request. Hence, the embodiments of the invention may allow multiple outgoing call connection requests to be transmitted without use of call routing queries and redirection of the incoming call.

In embodiments of the invention, the initial call connection request is received at a telephone switch located in the telecommunications system, and the first incoming call connection request is transmitted from the telephone switch. Hence, the certain embodiments provide delivery of calls made to a subscriber's device-shared telephone dialing number to multiple telephone devices by acting as the local exchange switch for these telephony devices.

In embodiments of the invention, the first incoming call connection request is received by a service platform separate from the telephone switch in the telecommunications system, and the first and second outgoing call connection requests are transmitted from the service platform. Hence, call control for certain embodiments may be carried out at a service platform.

In embodiments of the invention, the first telephony device is located in a different network to the mobile telephone network in the telecommunications system, and the different network comprises a public switched telephone network, an Internet Protocol Multimedia Subsystem network, or an Internet Protocol data network. Hence, when there is an incoming call to a subscriber, the one or more embodiments allow a subscriber's mobile telephone in a mobile telephone network to ring and other telephony devices located outside the mobile telephone network to ring simultaneously.

In embodiments of the invention, the first telephony device comprises a Session Initiation Protocol telephony device, and the transmittal of the first outgoing call connection request to the first telephony device, comprises transmitting a Session Initiation Protocol Invite message to the first telephony device. Hence, if the first telephony device is SIP compliant, a call leg to the first telephony device may be set up using transfer of SIP signalling information between the service platform and the SIP compliant telephony device.

Embodiments of the invention may comprise registering the location of the Session Initiation Protocol telephony device with the service platform, whereby the service platform ascertains a network address of the Session Initiation Protocol telephony device to transmit the first outgoing call connection request to. Hence, existing SIP functionality can be employed to ascertain the location of subscriber telephony devices which are SIP compliant or which have suitable SIP compliant adaptors (such as an Analogue Telephone Adapters (ATA)) connected to them.

Embodiments of the invention may comprise in response to receiving the call connection response from the one of the first telephony device and the mobile telephony device, cancelling the outgoing call connection request to the other of the first telephony device and the mobile telephony device. Hence, pending call connections to devices which have not been answered can be cancelled, thus stopping the unanswered telephony device from ringing unnecessarily and helping to free up network resources.

In embodiments of the invention, the telephone switch comprises one of a mobile switching centre located in a mobile telephone network in the telecommunications system, a local wireline telephone exchange switch located in a public switched telephone network in the telecommunications system, and a Call Session Control Function entity located in an IP Multimedia Subsystem network in the telecommunications system. Hence, subscriber telephony devices served by a variety of different telephone switches located in a variety of different networks may be accommodated for in the one-telephone dialing number telephony service.

In embodiments of the invention, the first telephony device is a shared telephony device associated with multiple subscribers, wherein the first outgoing call connection request causes the first telephony device to alert the subscriber associated with the first telephony device and the mobile telephony device in a manner particular to the subscriber. Hence, embodiments of the invention allow for multiple subscribers to share telephony devices. Each subscriber of the device-shared service has a device-shared telephone number and a call to a subscriber's device-shared telephone number causes the subscriber's mobile telephony device to ring at the same time as one or more shared telephony devices, for example a landline telephone located in a communal part of a household. An alerting mechanism particular to one subscriber can be used to distinguish calls on the shared telephony device, allowing other members of the household to determine the intended recipient without needing to answer the call themselves.

The alerting mechanism may include a distinctive ring pattern, so that a particular subscriber can identify incoming calls to him by recognising a ringing pattern or cadence of the shared telephony device which is particular to him. The distinctive ringing may be associated with multiple distinctive ringing functionality. Alternatively, a particular subscriber may be alerted by a distinctive visual alerting method, for example a flashing icon on a display part of a shared telephony device.

Embodiments of the invention may comprise in response to the transmittal of the first outgoing call connection request, receiving a call transfer request from the first telephony device, wherein the second outgoing call connection request is transmitted to the mobile telephony device in response to receipt of the call transfer request, wherein the call connection response is received from the mobile telephony device, and wherein the connecting step comprises transferring the incoming call from the first telephony device to the mobile telephony device. Hence, a subscriber can transfer a call they are conducting on their first telephony device to their mobile telephone.

In accordance with a second aspect of the present invention, there is provided a method of providing telephony services to subscribers in a telecommunications system including a mobile telephone network, each of a plurality of subscribers having a plurality of associated telephony devices including a shared telephony device associated with multiple subscribers and a subscriber-specific mobile telephony device, each of the plurality of devices associated with a subscriber being contactable via a device-shared telephone dialing number, the method comprising the steps of:

receiving a first incoming call connection request associated with an incoming call directed to a first device-shared telephone dialing number for a first subscriber;

in response to receiving the first incoming call connection request, transmitting a first outgoing call connection request to the shared telephony device, wherein the first outgoing call connection request is adapted to cause the shared telephony device to alert with a first alerting indicator;

receiving a second incoming call connection request associated with an incoming call directed to a second device-shared telephone dialing number for a second subscriber; and in response to receiving the second incoming call connection request, transmitting a second outgoing call connection request to the shared telephony device, wherein the second outgoing call connection request is adapted to cause the shared telephony device to alert with a second alerting indicator, different to the first alerting indicator.

Hence, a subscriber with a mobile telephone and a telephony device they share with one or more other subscribers can be alerted via both the mobile and shared telephony devices. A particular subscriber can distinguish calls to them on the shared telephony device by recognising an alerting indicator particular to that subscriber, for example an audio or visual alerting indicator.

In accordance with a third aspect of the present invention, there is provided a method of providing telephony services to subscribers in a telecommunications system including a mobile telephone network having a subscriber database, the subscribers each having an associated telephone dialing number and a plurality of associated telephony devices including a mobile telephony device, all of the devices associated with a subscriber being contactable via a device-shared telephone dialing number, the method comprising the steps of:

receiving an incoming call connection request associated with an incoming call directed to the device-shared telephone dialing number for a subscriber;

in response to receipt of the incoming call connection request, connecting the incoming call to one of a first telephony device and a mobile telephony device associated with the subscriber;

receiving a call transfer request from the telephony device to which the incoming call was connected to;

in response to receipt of the call transfer request, transmitting an outgoing call connection request to the other of the first telephony device and the mobile telephony device, wherein if the outgoing call connection request is transmitted to the mobile telephony device, the outgoing call connection request is based upon a location query being sent to the subscriber database in relation to the device-shared telephone dialing number;

receiving a call connection response from the telephony device to which the outgoing call connection request was transmitted to; and transferring the incoming call to the telephony device from which the call connection response was received from.

Hence, call transfer functionality is provided in association with a one-telephone dialing number telephony service, so that calls can be transferred between telephony devices without the need for allocation of multiple telephone dialing numbers.

In accordance with a fourth aspect of the present invention, there is provided apparatus adapted to perform the method of the first aspect of the invention.

In accordance with a fifth aspect of the present invention, there is provided computer software adapted to perform the method of the first aspect of the invention.

Further features and advantages will become apparent from the following description of certain embodiments of the invention, given by way of example only, which is made with reference to the accompanying drawings.

DETAILED DESCRIPTION OF CERTAIN INVENTIVE EMBODIMENTS

Figure 1:
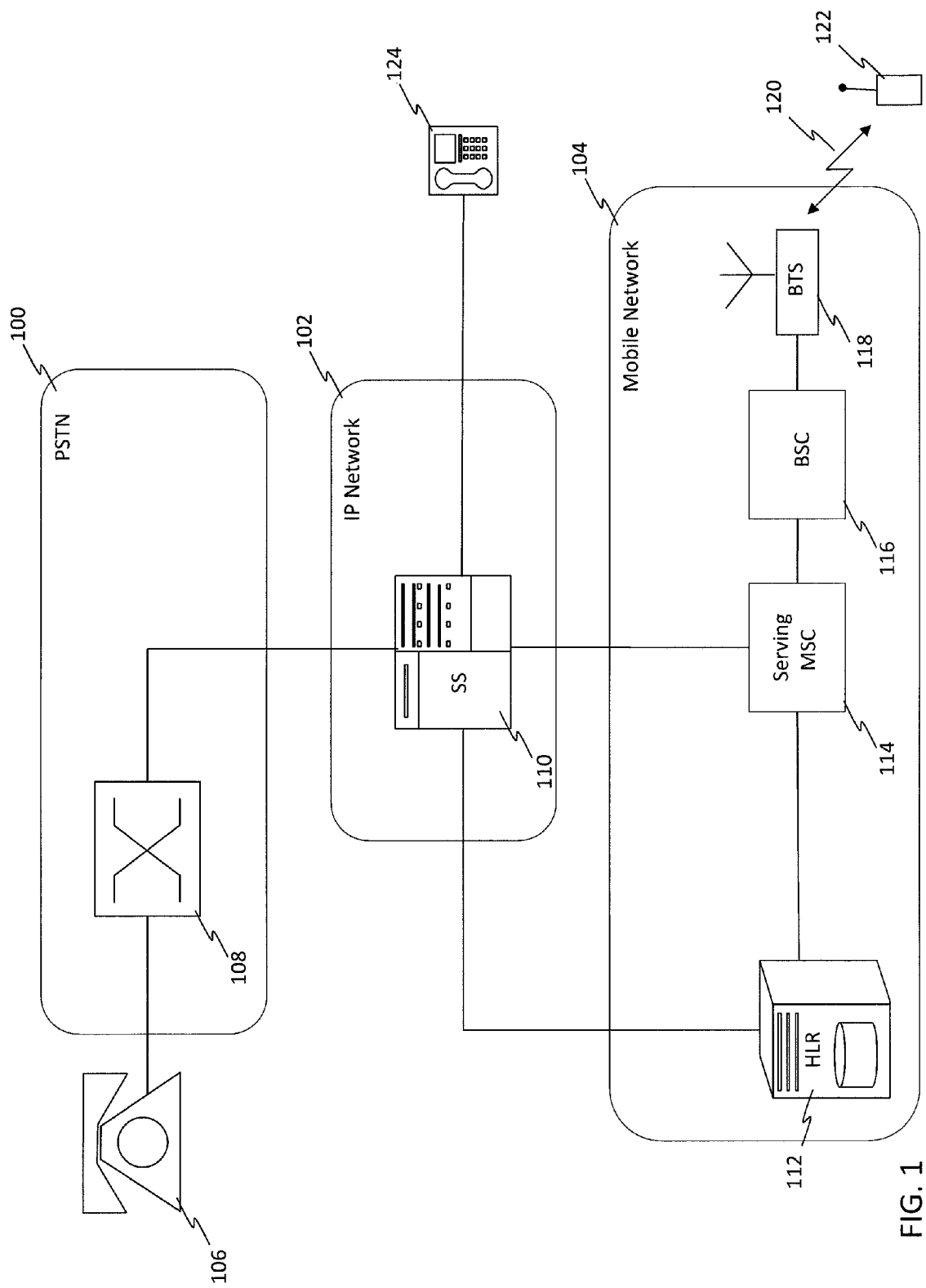
FIG. 1 shows a system diagram according to embodiments of the present invention.

FIG. 1 shows a system diagram according to embodiments of the present invention. FIG. 1 shows a telecommunications system which includes a Public Switched Telephone Network (PSTN) 100, an Internet Protocol (IP) network 102 and a mobile network 104. In this embodiment, a device-shared telephone dialing number telephony service is hosted by a call control system 110 located in IP network 102 where data is primarily transferred using an Internet Protocol (also called an IP domain). IP network 102 interfaces with Public Switched Telephone Network (PSTN) 100 and also mobile network part 104 (also called a cellular network part) in the telecommunications system. Mobile network 104 may also interface directly (not shown) with PSTN 100. Here, a subscriber to a device-shared telephone dialing service has two telephones, mobile telephone 122 and SIP telephone 124 upon which they wish to be contacted.

The interfaces between PSTN 100, IP network 102, and mobile network 104 may include one or more gateway or session border controller entities (not shown) which carry out conversion between the various protocols and data formats used to transfer media data and signalling data in the different networks making up the telecommunications system. A media gateway (not shown) converts between the different protocols of media data passing between PSTN 100, IP network 102 and mobile network 104 such as packetised Voice over Internet Protocol (VoIP) data into Time-Division-Multiplexing (TDM) voice data and vice versa. A signalling gateway (not shown) converts between the different protocols of signalling information passing between PSTN 100, IP network 102 and mobile network 104 such as SIP, Signalling System 7 (SS7), Integrated Services Digital Network User Part (ISUP), American National Standards Institute (ANSI)-41, Mobile Application Part (MAP) formats, etc.

IP network 102 includes an IP compliant telephony device 124, such as a Voice over Internet Protocol (VoIP) telephone or a SIP telephone. Telephony device 124 is provided with a telephony service via call control system 110.

Call control system 110 may comprise a media gateway controller, service platform, call agent or softswitch and may perform other functions typically associated with such entities. The term 'softswitch' is used hereinafter to refer to call control system 110 (denoted 'SS in FIG. 1). One or more media and/or signalling gateways interfacing between PSTN 100, IP domain 102, and mobile network 104 may be controlled by softswitch 110, or their function may be combined into softswitch 110 itself.

As well as conventionally providing the architecture for enabling conversion between both media data and signalling protocols via one or more media gateways and signalling gateways, softswitch 110 may conventionally provide call processing intelligence for use in the selection of processes that can be applied to a call, routing for a call within a network based on signalling and subscriber database information, the ability to transfer control of a call to another network element and management functions such as provisioning, fault detection and billing. For ease of explanation, it is hereafter assumed that softswitch 110 is one network entity, although in practice it may comprise a distributed set of entities.

PSTN 100 allows for provision of telephony services to a number of fixed-line telephones (also called landline or wireline telephones) although in this example only a single fixed-line telephone 106 is depicted. PSTN part 100 contains an originating local telephone exchange switch 108 (such as a 'class 5' switch) which provides telephony services to and from, i.e. serves, calling party telephone 106. In reality, local telephone exchange switch 108 will also serve other telephones (not shown) located in PSTN 100.

Mobile network 104 allows for provision of telephony services to a number of mobile telephones (also called cellular telephones), although in this example only a single mobile telephone 122 is depicted. In this embodiment, mobile network 104 is a GSM network comprising a mobile switching centre (MSC) 114 connected via a communications link to a base station controller (BSC) 116. BSC 116 controls a base transceiver station (BTS) 118 located remote from, and connected by, a further communications link to BSC 116. BTS 118 transmits radio signals to, and receives radio signals from, mobile telephone 122 via radio interface 120. Mobile telephone 122 is located in an area (commonly known as a 'cell') served by BTS 118. In reality, a number of BSCs and BTSs would be dispersed geographically across an area served by MSC 114 and multiple mobile telephones could communicate via BTS 118.

In the embodiment of FIG. 1, MSC 114 is depicted as a serving MSC as it provides a telephony service to a number of mobile telephones including mobile telephone 122. Serving MSC 114 is also connected via communications links to other MSCs (not shown) in mobile network 104. Mobile network 104 is provided with a home location register (HLR) 12, which is a database arranged to provide serving MSC 114 with data relating to subscribers and location of mobile telephones upon request. Subscribers may originate or receive a range of data via their mobile telephones, including multimedia, video, voice, data or fax calls or sessions, short messages using the Short Message Service (SMS), email messages, enhanced or multimedia messages, and may access data resources over private or public data networks such as the Internet. Signalling data and media data in respect of services provided to mobile telephone 122 is routed via serving MSC 114.

Embodiments of the invention may be implemented using the various entities depicted in FIG. 1. In these embodiments of the invention, calls to the subscriber's device-shared telephone dialing number are routed via PSTN network 100 to a call control system comprising a service platform 110 at which the main call processing and control functions are carried out.

Routing calls to the service platform may include assigning one or a block of telephone dialing numbers directly to the service platform (from which the subscriber's device-shared telephone dialing number is allocated), or using Number Portability methods (such as LNP) which allow individual telephone dialing numbers to be moved from one local telephone exchange switch to another local telephone exchange switch.

When a terminating call is received by the service platform, it attempts to ring the subscriber's mobile phone. To do this, it takes on the role of the subscriber's Gateway MSC (also known as a Home MSC or Originating MSC) and assumes control of the call. The service platform queries the subscriber's HLR for the location of the subscriber's telephone using the subscriber's device-shared telephone dialing number. The response typically contains a temporary routing number, for example a Temporary Local Directory Number (TLDN), which is a routeable network address up to 15 digits in length to route call establishment requests to the subscriber's current Serving MSC. The TLDN is allocated by the Serving MSC long enough for the call to be routed and then immediately released so that it may be reused. The service platform establishes a call to the temporary routing number, resulting in the subscriber's mobile phone ringing.

The service platform also invokes appropriate procedures which result in the subscriber's other telephony devices ringing. For example, for a SIP-based device, the apparatus sends the device an Invite message. As soon as one of the subscriber's telephony devices is answered, the apparatus connects the incoming call to the answered telephony device and cancels the calls to the subscriber's other telephony devices.

Figure 2:
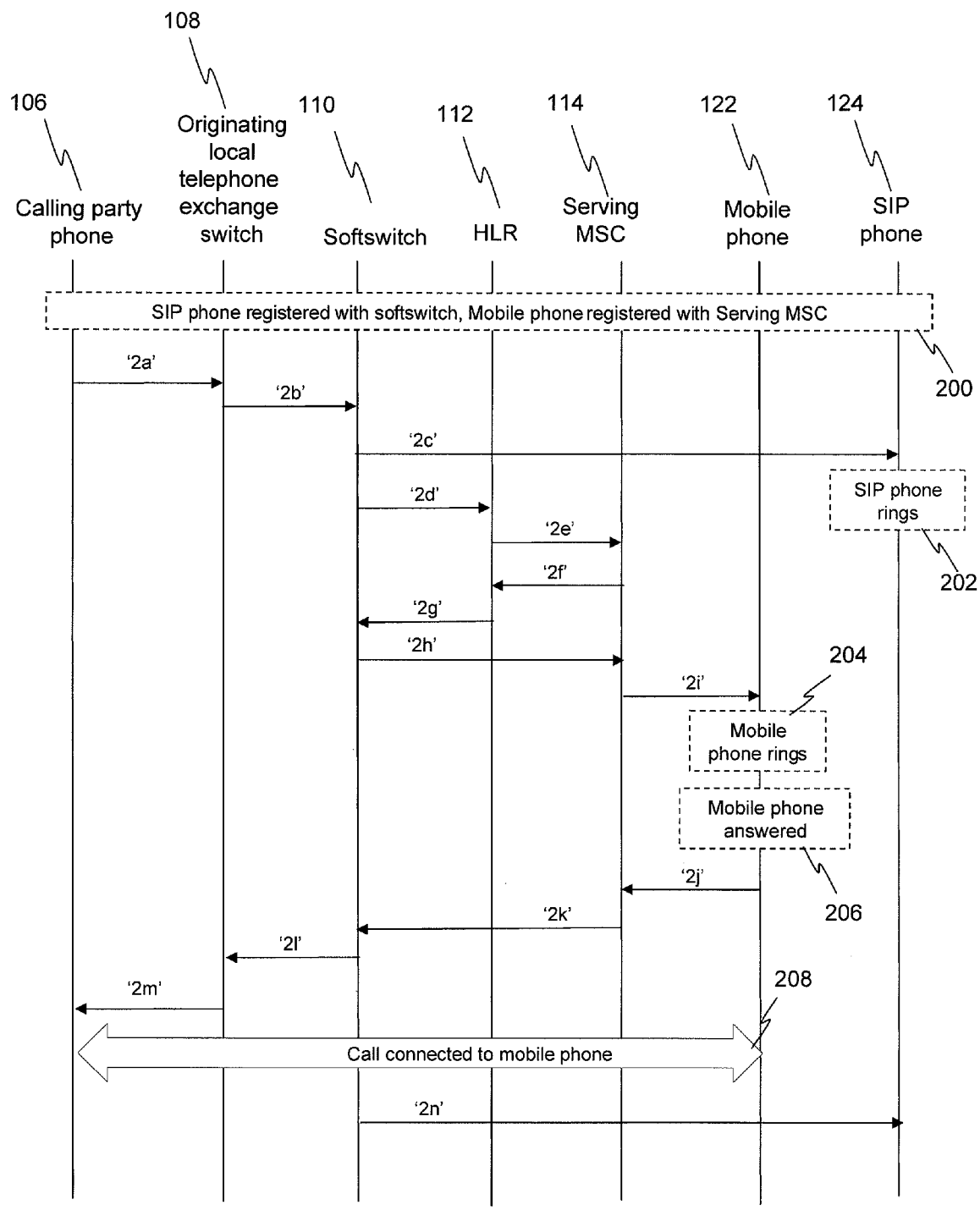
FIG. 2 is a flow diagram for a device-shared telephone dialing service according to an embodiment of the invention.

FIG. 2 is a flow diagram for a device-shared telephone dialing service according to an embodiment of the invention. In this embodiment, the service platform which carries out the main call processing and control functions is softswitch 110.

Before the device-shared telephone dialing service is operational, the locations of SIP phone 124 and mobile phone 122 should be registered with certain network entities (see step 200).

SIP phone 124 registers its current location in IP network 102 with softswitch 110, so that softswitch 110 knows how to direct incoming calls to SIP phone 124. This registration process may be carried out using SIP Register functionality where a SIP Register message is sent from SIP phone 124 to softswitch 110 containing data identifying the phone and where it can be located, e.g. sip_phone@this_domain.com. Registration may be carried out initially and then at periodic intervals subsequently. Softswitch 110 is then able to use the register association (commonly referred to as a 'binding') to address SIP messages to SIP phone 124. Alternatively, SIP phone 124 may register its location with a SIP Registrar network entity or SIP proxy server (not shown) responsible for processing registration of devices which can then be contacted by softswitch 110 to ascertain the location of SIP phone 124 in IP network 102.

When mobile telephone 122 enters a cell served by serving MSC 114, it registers its current location with serving MSC 114. Serving MSC 114 will then update an appropriate visitor location register (VLR) (not shown) which may be remote from or may be incorporated into serving MSC 114. Serving MSC 114 will then notify HLR 112 of the location of mobile telephone 122 and notify the MSC/VLR serving the cell where mobile telephone 122 was previously located that mobile telephone 122 is no longer there (although a VLR may be shared across several MSCs so such a location update may not need to be registered).

Use of the device-shared telephone dialing service begins when a calling party wishes to make a call via their calling party telephone 106 to a subscriber to the device-shared telephone dialing service. In this embodiment, calling party telephone 106 is an analogue telephone (sometimes called a black-phone or Plain Old Telephone Service (POTS) phone) located in PSTN 100 and the subscriber has two telephones on which they may be contacted, namely mobile telephone 122 located in mobile network 104 and SIP telephone 124 located in IP network 102.

The calling party dials the device-shared telephone dialing number for the subscriber which causes an initial call connection request to be transmitted to originating local telephone exchange switch 108 which serves calling party telephone 106, as shown by step 2a. Originating local telephone exchange switch 108 has been configured to generate a first incoming call connection request for a call directed to the subscriber's telephone dialing number, which is transmitted to softswitch 110 in step 2b. This can be seen as local telephone exchange switch 108 forwarding on the initial call connection request of step 2a in the form of the first incoming call connection request of step 2b to softswitch 110.

Softswitch 110 processes the first incoming call connection request of step 2b and identifies that the request relates to an incoming call to a device-shared telephone dialing services subscriber. Softswitch 110 assumes control of the call and proceeds to create call legs to each of the telephony devices of the subscriber, in this case mobile phone 122 and SIP phone 124.

A first outgoing call connection request is sent to SIP phone 124 in step 2c in the form of a SIP Invite message containing data identifying the device-shared telephone dialing number for the subscriber. SIP phone will then begin to ring (see item 202) and will typically respond by sending a SIP 180 Ringing message (not shown) back to softswitch 110.

Before a call connection request can be sent to mobile phone 122, the location of mobile phone 122 must be determined. This is carried out by softswitch 110 transmitting a location query containing the device-shared telephone dialing number for the subscriber to HLR 112 in step 2d, for example in the form of a 'LOCREQ' message as per the ANSI-41 standard. HLR 112 then requests a Temporary Local Directory Number (TLDN) from serving MSC 114 in step 2e, for example in the form of a 'ROUTREQ' message as per the ANSI-41 standard. Serving MSC 114 allocates a TLDN for the call and responds to HLR 112 accordingly in step 2f. HLR 112 then forwards the allocated TLDN to softswitch 110 in step 2g.

Softswitch 110 transmits a second outgoing call connection request to mobile phone 122 via mobile serving MSC 114 in step 2h, for example in the form of an Initial Address Message (JAM) as per the ISUP standard. Serving MSC 114 sets up a call to mobile phone 122 in step 2i, which starts to ring accordingly (see item 204).

Both of the subscriber's telephony devices are now ringing, and in this case the subscriber answers mobile phone 122 (see item 206) which causes an answer message to be transmitted from mobile phone 122 to serving MSC 114 in step 2j. Serving MSC 114 informs softswitch 110 that mobile phone 122 has been answered by transmitting a call connection response in step 2k, for example in the form of an Answer Message (ANM) as per the ISUP standard. Softswitch forwards the ANM message to calling party telephone 106 via originating local telephone exchange switch 108 in steps 2l and 2m.

A call is now connected between calling party telephone 106 and mobile phone 122 and media data (for example voice data) may flow between the two (see item 208). SIP phone 124 was not answered by the subscriber, so softswitch cancels the call connection request to it, for example by transmitting a SIP Cancel message to SIP phone 124 in step 2n.

Note that the call connection request of step 2b is an incoming call connection request as it is incoming to softswitch 110, whereas the call connection requests of steps 2c and 2h are outgoing call connection requests as they are outgoing from softswitch 110.

In the embodiment of the invention described above in relation to FIG. 2, calling party telephone 106 is connected to PSTN network 100. In alternative arrangements, calling party telephone 106 can be connected via a different network, such as IP network 102, mobile network 104 or one or more other networks.

Figure 3:
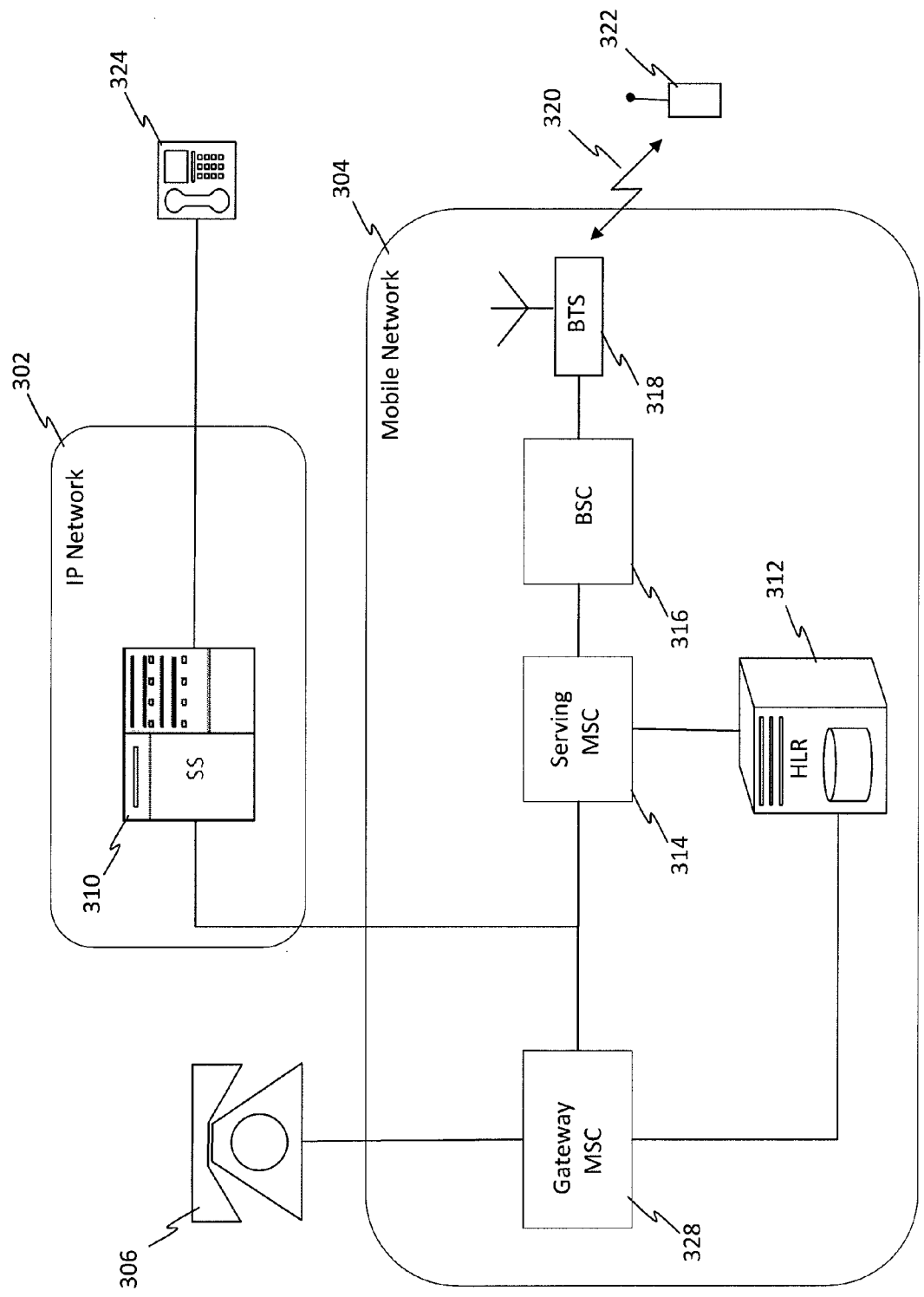
FIG. 3 shows a system diagram according to embodiments of the present invention.

FIG. 3 shows a system diagram according to embodiments of the present invention. FIG. 3 shows a telecommunications system with several components common to FIG. 1, namely IP network 302, softswitch 310, SIP phone 324, mobile network 304, HLR 312, serving MSC 314, BSC 316, BTS 318, mobile telephone 322, radio interface 320, and calling party telephone 306.

Similarly to entity 110 in FIG. 1, entity 310 in FIG. 3 may comprise a media gateway controller, service platform, call agent, softswitch or other network entity with appropriate data processing functionality and network connections.

FIG. 3 also includes a gateway MSC 328 located in mobile network 304, or a different mobile network (not shown). A gateway MSC is a gateway telephone switch to which a call to a mobile telephone can be routed without any knowledge of the location of the mobile telephone to which the call is directed. A gateway MSC is responsible for obtaining location information and for routing a call to a serving MSC for the subscriber to which the call is directed. A gateway MSC determines this information by interrogating an appropriate network entity such as an appropriate HLR with reference to the called mobile telephone number. Although FIG. 3 depicts gateway MSC 328, HLR 312 and serving MSC 314 as being in the same mobile network 304, in reality the HLR which is interrogated by a gateway MSC may be in a different mobile network to the gateway MSC, which may in turn be in a different mobile network to the relevant serving MSC. The different mobile networks may be linked together by a PSTN via one or more signalling and media gateways (not shown).

Further, in FIG. 3, calling party telephone 306 is depicted as interfacing directly with gateway MSC 328, but in reality one or more wireline local telephone exchange switches or other MSCs may be involved in the connection between calling party telephone 306 and gateway MSC 328.

Embodiments of the invention may be implemented using the various entities depicted in FIG. 3. In these embodiments, calls to the subscriber's device-shared telephone dialing number are routed in the first instance to a mobile network. The mobile network is configured so that calls to the subscriber's device-shared telephone dialing number trigger a first call routing query to be sent to a softswitch at which the main call processing and control functions are carried out. The telephone switch may be configured to query the subscriber database for transmission data identifying the location of the softswitch, i.e. where to transmit call routing queries to.

The response provided by the softswitch to a call routing query can be interpreted by the mobile network so as to determine how to treat the call. The exact nature of the call routing query depends upon mobile network technology particular to the mobile network, for example based upon the Wireless Intelligent Network (WIN) or Customised Applications for Mobile networks Enhanced Logic (CAMEL) standards.

When a primary call connection request is received by the mobile network, a first call routing query is sent by the mobile network to the softswitch. The response from the softswitch causes the call to be redirected to the softswitch, for example by modifying the called number to a telephone dialing number which routes to the softswitch.

When the redirected call is received, the softswitch is now in control of the call and typically attempts to ring the subscriber's mobile telephone by creating a secondary call connection request directed to the device-shared telephone dialing number of the subscriber. To do this, the softswitch establishes a call to the subscriber's telephone number which will be routed to the mobile network. This new call will typically result in the mobile network triggering a fresh call routing query to the softswitch. The softswitch identifies that the second call routing query has resulted from the call it has originated, for example by inspecting certain parameters of the call (such as redirection information, calling number, called number, number of incoming call connection requests, etc). The softswitch response causes the mobile network to invoke normal call termination procedures which ultimately results in the subscriber's mobile phone ringing.

The softswitch also invokes appropriate procedures which result in the subscriber's other telephony devices ringing. For example, for a SIP-based device, the apparatus might send the device an Invite message. As soon as one of the subscriber's telephony devices is answered, the softswitch connects the incoming call to the answered telephony device and cancels the calls to the subscriber's other telephony devices.

Figure 4A:
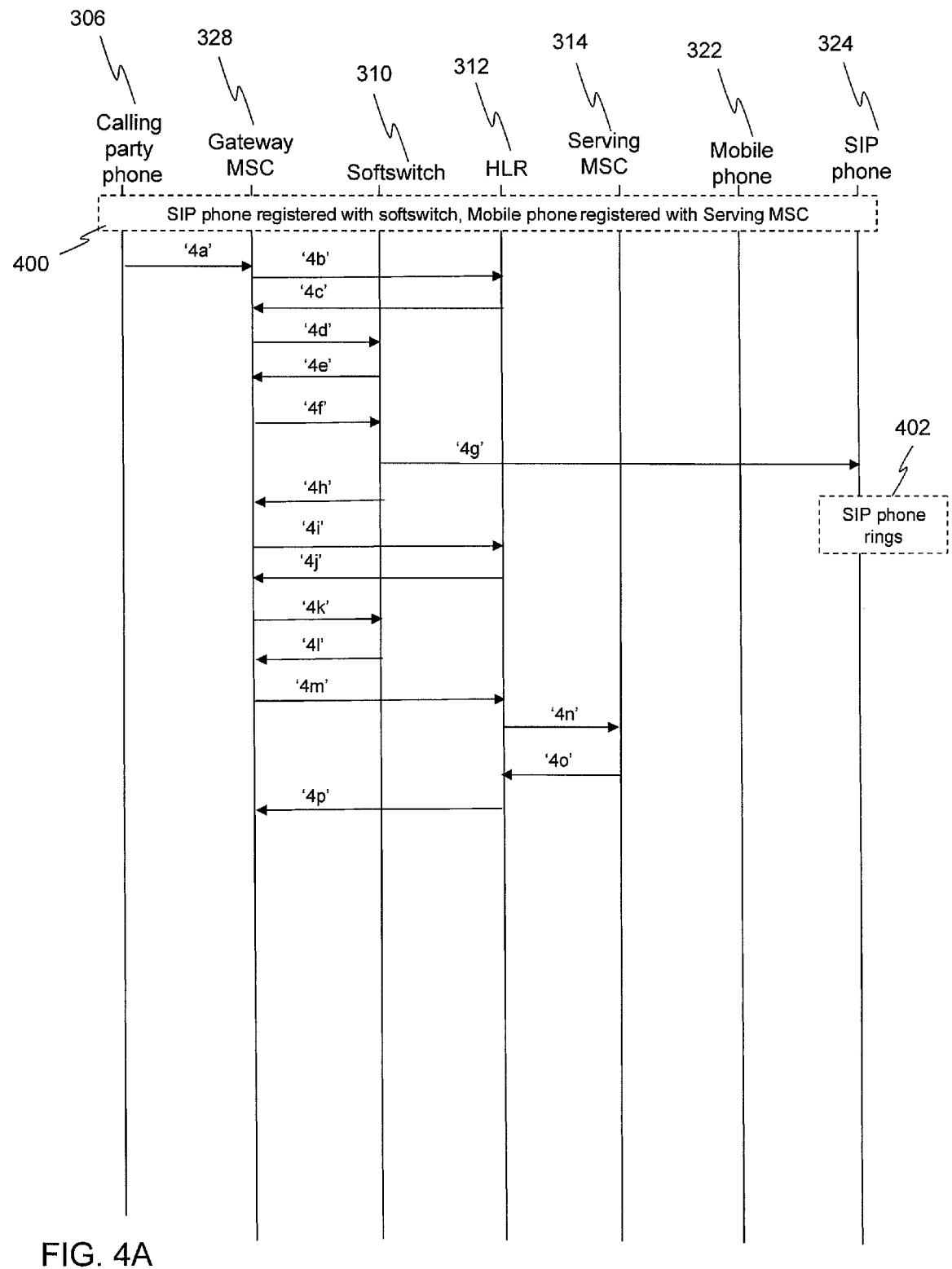
FIGS. 4A and 4B are a flow diagram for a device-shared telephone dialing service according to an embodiment of the invention.
Figure 4B:
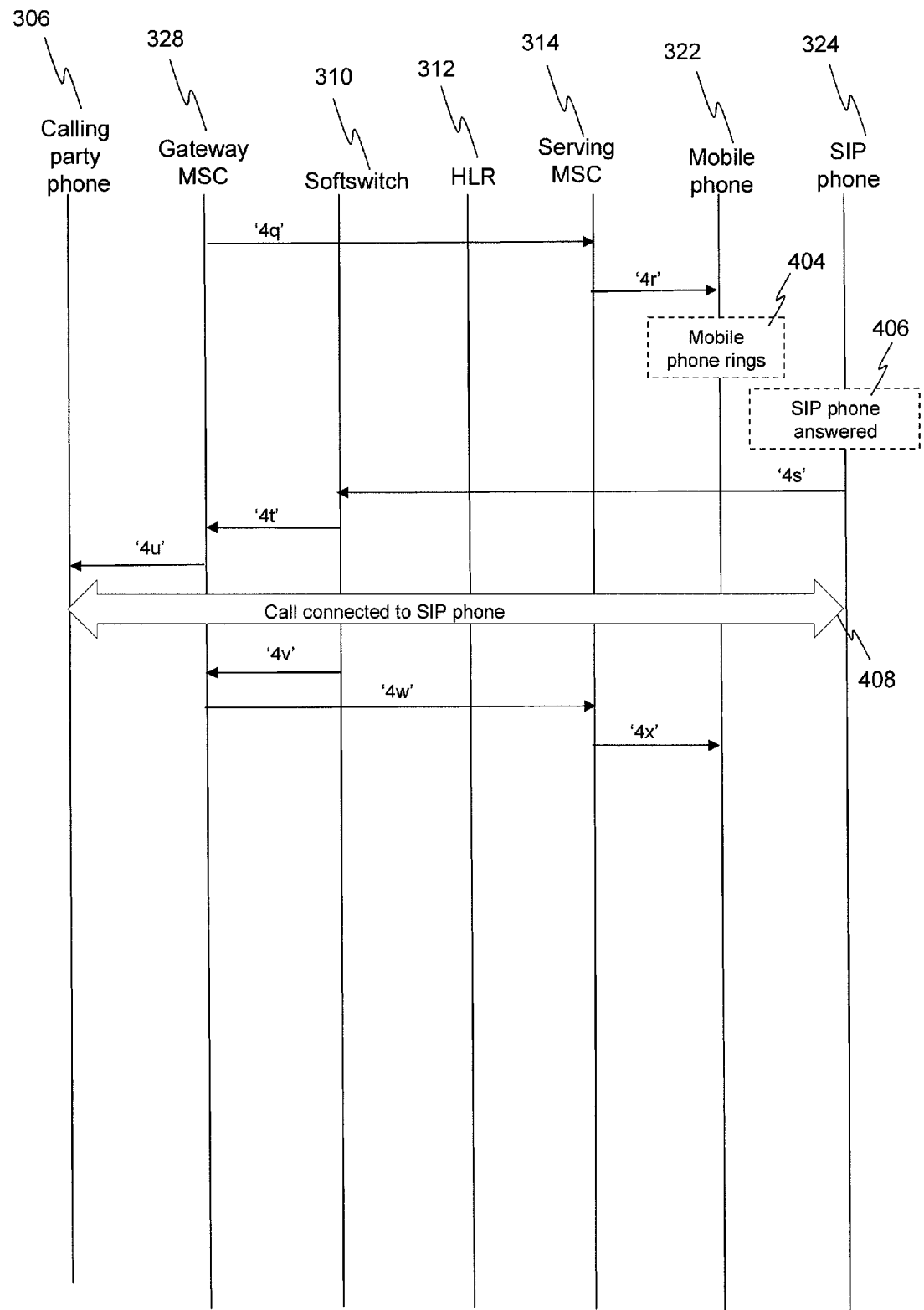

FIGS. 4A and 4B are a flow diagram for a device-shared telephone dialing service according to an embodiment of the invention. In this embodiment the network entity which carries out the main call processing and control functions is softswitch 310. In this embodiment, the subscriber has two telephones on which they may be contacted, namely mobile telephone 322 located in mobile network 304 and SIP telephone 324 located in IP network 302.

Before the device-shared telephone dialing service is operational, the location of mobile phone 322 is registered with serving MSC 314 and the location of SIP phone 324 is registered with softswitch 310 (or a SIP Registrar entity or SIP proxy server) using SIP Register messaging functionality (see item 400).

Use of the device-shared telephone dialing service begins when a calling party wishes to make a call via their calling party telephone 306 to a subscriber to the device-shared telephone dialing service. In this embodiment, calling party telephone 306 could be an analogue telephone located in a PSTN, a mobile telephone located in a mobile network, or a SIP telephone located in an IP network. Either way, the call directed to the device-shared telephone dialing number of the subscriber is routed to gateway MSC 328 (see step 4a) in the form of a primary call connection request using call processing techniques known to one skilled in the art.

Gateway MSC 328 is configured to send a location query containing the device-shared telephone dialing number for the subscriber to HLR 312 (a subscriber database) when it receives the call connection request of step 4a and does so accordingly in step 4b.

HLR 312 responds to the query of step 4b in step 4c. The response of step 4c from HLR 312 contains information concerning one or more triggers (such as WIN or CAMEL triggers, etc.) to be applied to the call including appropriate transmission data in the form of contact information for softswitch 310, such as a network address. These triggers instruct gateway MSC 328 to transmit a first call routing query to softswitch 310 in step 4d, for example in the form of a 'WIN ANLYZD' message according to the notation adopted by the Telecommunications Industry Association.

Softswitch 310 processes the first call routing query of step 4d and identifies that it relates to an incoming call to a device-shared telephone dialing services subscriber. Softswitch 310 thus requests that the call be redirected to it by transmitting a call redirection request to gateway MSC 328 in step 4e. Gateway MSC 328 responds to the redirect request of step 4e by redirecting the incoming call to softswitch 310 which results in a first incoming call connection request being sent to softswitch 310 in step 4f.

Once the call has been redirected to softswitch 310, softswitch 310 is then in control of the call. Softswitch 310 now proceeds to create call legs to each telephony devices of the subscriber, in this case mobile phone 322 and SIP phone 326.

A first outgoing call connection request is sent to SIP phone 324 in step 4g in the form of a SIP Invite message containing data identifying the device-shared telephone dialing number for the subscriber. SIP phone 324 will then begin to ring (see item 402) and will typically respond by sending a SIP 180 Ringing message (not shown) back to softswitch 310.

Softswitch 310 transmits a secondary call connection request to gateway MSC 328 in step 4h.

Gateway MSC 328 is configured to send a location query containing the device-shared telephone dialing number for the subscriber to HLR 312 (a subscriber database) when it receives the call connection request of step 4h and does so accordingly in step 4i.

HLR 312 responds to the query of step 4i in step 4j which contains information concerning one or more triggers to be applied to the call. Gateway MSC 328 then transmits a second call routing query to softswitch 310 in step 4k.

Similarly to step 4c, the response of step 4j will contain appropriate transmission data in the form of contact information for softswitch 310.

Softswitch 310 identifies the fact that it has received two incoming call routing queries in association with the subscriber's device-shared telephone dialing number and notifies gateway MSC 328 accordingly in step 4l. The notification of step 4l prompts gateway MSC 328 to carry out a call connection to mobile phone 322.

Before an outgoing call connection request can be sent to mobile phone 322, the location of mobile phone 322 must be determined. This is carried out by gateway MSC 328 transmitting a location query containing the device-shared telephone dialing number for the subscriber to HLR 312 in step 4m. HLR 312 then requests a Temporary Local Directory Number (TLDN) from serving MSC 314 in step 4n. Serving MSC 314 allocates a TLDN for the call and responds to HLR 312 accordingly in step 4o. HLR 312 then forwards the allocated TLDN to gateway MSC 328 in step 4p.

Gateway MSC 328 transmits a second outgoing call connection request to serving MSC 314 in step 4q. Serving MSC 314 sets up a call to mobile phone 322 in step 4r, which starts to ring accordingly (see item 404).

Both of the subscriber's telephony devices are now ringing, and in this case, the subscriber answers SIP phone 324 (see item 406) which causes a SIP 200 OK to be transmitted from SIP phone 324 to softswitch 310 as shown in step 4s. Softswitch informs calling party telephone 306 that SIP phone 324 has been answered via gateway MSC 328 and any other intermediate telephone switches (not shown) in steps 4t and 4u.

A call is now connected between calling party telephone 306 and SIP phone 324 and media data may flow between the two (see item 408). Mobile phone 322 was not answered by the subscriber, so softswitch cancels the outgoing call connection request to it, via gateway MSC 328 and serving MSC 314 in steps 4v, 4w and 4x.

It should be noted that as far as gateway MSC 328 is concerned, step 4a and step 4h are both call connection requests for incoming calls directed to mobile phone 322 of the subscriber, so gateway MSC 328 behaves in the same way in each case. The second call routing query of step 4k will contain similar information as the first call routing query of step 4d, although the step 4k call routing query includes details of secondary call connection request 4h whereas the step 4d call routing query includes details of primary call connection request 4a. This means that softswitch 310 can make the secondary call connection request of step 4h different from the primary call connection request of step 4a (for example by adding redirection information to the call parameters). This allows softswitch 310 to discriminate between the first and second call routing queries of steps 4d and 4k and identify that they are both associated with the same telephone dialing number and respond appropriately with the notification of step 4l.

In the embodiment of the invention described above in relation to FIGS. 4A and 4B, softswitch 310 identifies the fact that it has received two call routing queries in association with the subscriber's device-shared telephone dialing number and notifies gateway MSC 328 accordingly in step 4l. The notification of step 4l prompts gateway MSC 328 to carry out an outgoing call connection to mobile phone 322.

In alternative embodiments of the invention, instead of analysing incoming call connection requests, for example counting the number of incoming call connection requests in association with a device-shared telephone dialing number for a subscriber, softswitch 310 analyses redirection information associated with the call to the subscriber. For example, if analysis of redirection information for a call to the subscriber reveals that the call has been redirected more than a certain number of times, then softswitch 310 notifies gateway MSC 328 that outgoing call connection to the subscriber's mobile phone 322 should be carried out without a further call routing query being made.

In the embodiment of the invention described above in relation to FIGS. 4A and 4B, after step 4l, gateway MSC 328 sends a location query to HLR 312 and obtains a TLDN in response by which mobile phone 322 may be contacted. The flows for steps 4m to 4p are similar to steps 2d to 2g in FIG. 2 except that in FIG. 4A gateway MSC 328 initiates the location query, whereas in FIG. 2, softswitch 110 initiates the location query.

In FIG. 2, the location query sent to HLR 112 in step 2d may be similar to the location query sent to HLR 312 in step 4b in FIG. 4A. For example, in ANSI-41, this will be a LOCREQ message with the TRIGTYPE parameter set to "Mobile_Termination". However, in step 4c of FIG. 4A, HLR 312 provides a different response because in FIG. 4A the subscriber is provisioned in the HLR with one or more wireless triggers, such as WIN or Customised Application for Mobile network Enhanced Logic (CAMEL) triggers, whereas the subscriber in FIG. 2 is not so provisioned.

In the location query of step 4m in FIG. 4A, the location query will indicate that wireless triggers have already been invoked, otherwise HLR 312 would just send back the same response as in step 4c again. For example in ANSI-41 this will be a LOCREQ message with the TRIGTYPE parameter set to "Location".

In embodiments of the invention, the notification of gateway MSC 328 by softswitch 310 involves instructing gateway MSC 328 to send a location query to HLR 312 for the location of mobile phone 322 and also to transmit a second outgoing call connection request to mobile phone 322 without generating a further call routing query.

In an alternative embodiment of the invention to that depicted in FIGS. 4A and 4B, HLR 312 sends a call routing query directly to softswitch 310 (instead of instructing Gateway MSC 328 to do so).

Figure 5:
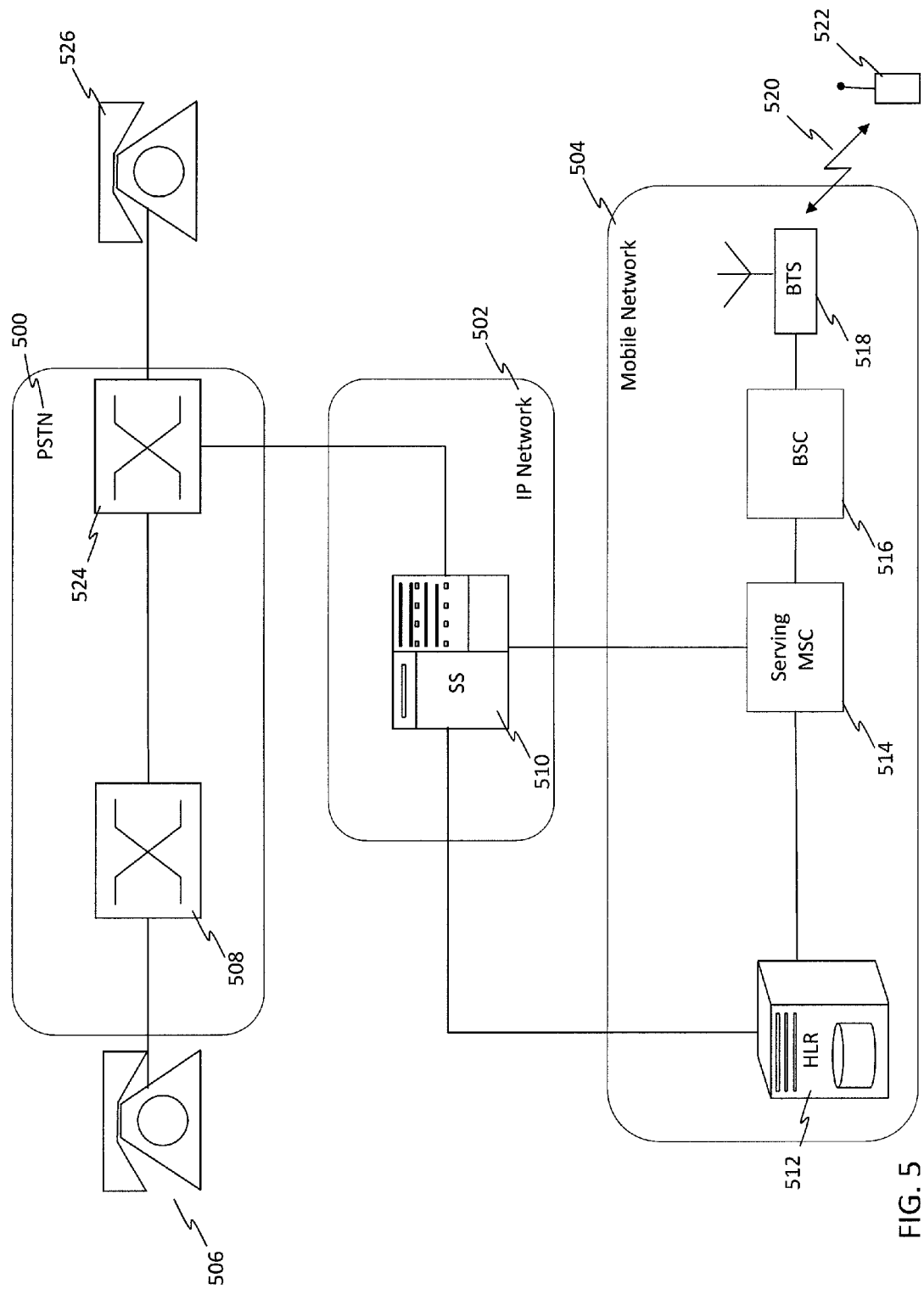
FIG. 5 shows a system diagram according to embodiments of the present invention.

FIG. 5 shows a system diagram according to embodiments of the present invention. FIG. 5 shows a telecommunications system with several components common to FIG. 1, namely PSTN 500, IP network 502, mobile network 504, softswitch 510, HLR 512, serving MSC 514, BSC 516, BTS 518, mobile telephone 522, radio interface 520, calling party telephone 506 and originating local telephone exchange switch 508. Here, however, instead of a SIP telephone, the subscriber has an analogue telephone 526 on which they may be contacted. The subscriber's analogue telephone 526 is served by a terminating local telephone exchange switch 524 which is connected to softswitch 510 and originating local telephone exchange switch 508 possibly via one or more other telephone exchange switches (not shown).

Figure 6:
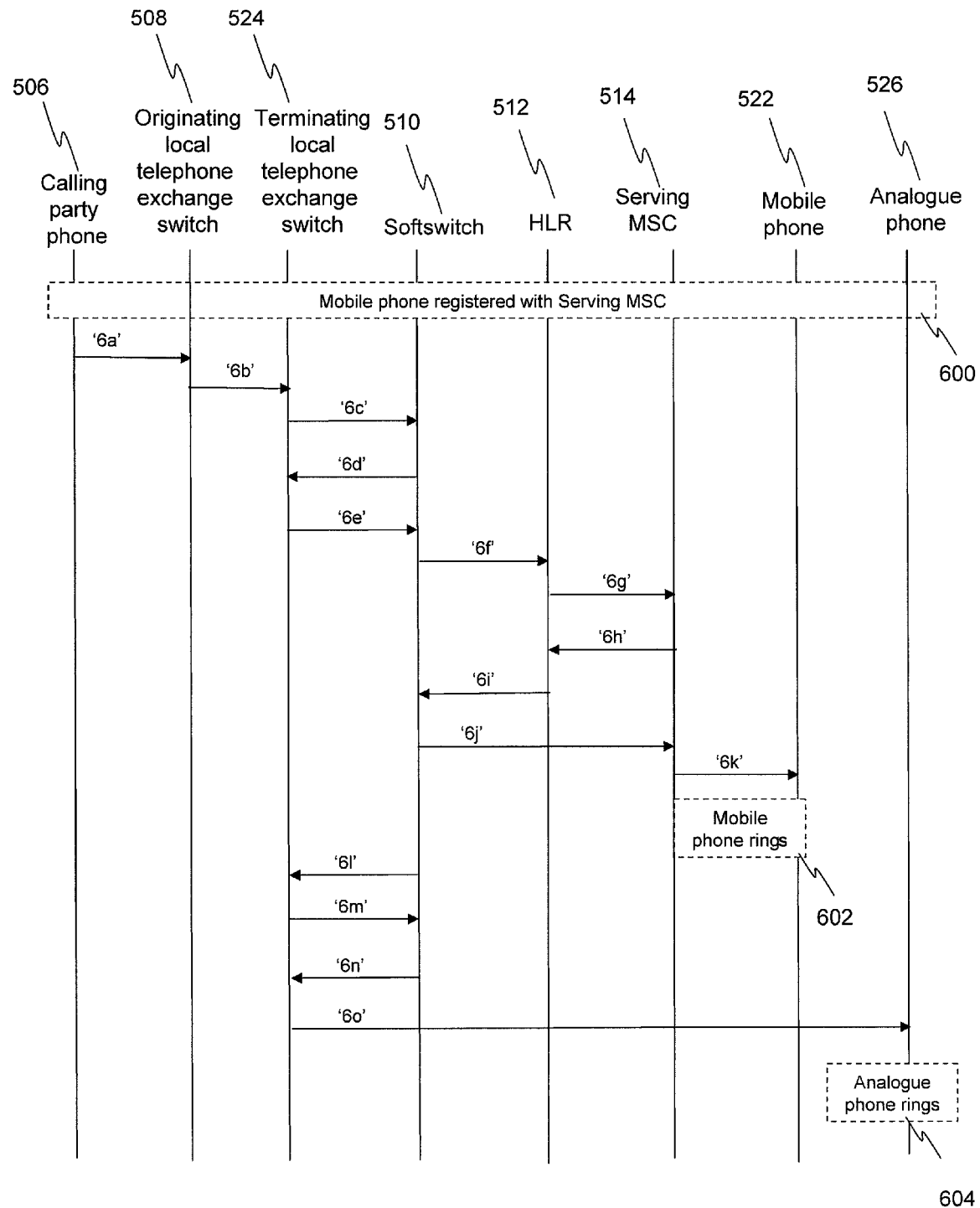
FIG. 6 is a flow diagram for a device-shared telephone dialing service according to an embodiment of the invention.

FIG. 6 is a flow diagram for a device-shared telephone dialing service according to an embodiment of the invention. This embodiment may be implemented using the various entities depicted in FIG. 5.

Before the device-shared telephone dialing service is operational, the location of mobile phone 522 is registered with serving MSC 514. The subscriber's analogue telephone 526 is served by terminating local telephone exchange switch 524 which is configured to direct calls it receives to the subscriber's device-shared telephone number to analogue telephone 526. Terminating local telephone exchange switch 524 is configured to generate call routing queries for calls directed to the subscriber's telephone dialing number and transmit these to softswitch 510.

Use of the device-shared telephone dialing service begins when a calling party wishes to make a call via their calling party telephone 506 to a subscriber to the device-shared telephone dialing service. In this embodiment, calling party telephone 506 is an analogue telephone located in PSTN 500 and the subscriber has two telephones on which they may be contacted, namely mobile telephone 522 located in mobile network 504 and analogue telephone 526 located in PSTN 500.

The calling party dials the device-shared telephone dialing number for the subscriber which causes the appropriate dialing digits to be transmitted to originating local telephone exchange switch 508 which serves calling party telephone 506, as shown by step 6a.

In order to route the call to terminating local telephone exchange switch 524, originating local telephone exchange switch 508 must first determine the location of terminating local telephone exchange switch 524. Local telephone exchange switches normally route telephone calls based on the first few digits of the dialed number. However, almost all local telephone exchange switches provide a means to enable telephone numbers to be moved from one local telephone exchange switch to another, typically operated by another service provider. This is known as Local Number Portability (LNP).

With LNP, local telephone exchange switches and intermediate switches can no longer determine the identity of the terminating local exchange switch to which the call should be routed by inspection of the first few digits of the dialed number. Instead, the switch must send a query to an external computing system which has access to a database that identifies the terminating local telephone exchange switch for each number that has been ported. The response from the external computing system to this query is either:

a) identification of the terminating local telephone exchange switch to which the dialed number has been ported by means of a Location Routing Number (LRN), or b) confirmation that the dialed number has not been ported and can therefore be routed based on its first few digits.

With the information provided in either of these responses, the local telephone exchange switch can route the call correctly.

Once originating local telephone exchange switch 508 has determined the location of terminating local telephone exchange switch 524, it transmits a primary call connection request directed to the device-shared telephone dialing number of the subscriber to terminating local telephone exchange switch 524 in step 6b.

Terminating local telephone exchange switch 524 has been configured to generate call routing queries for calls directed to the subscriber's telephone dialing number, and transmits a first call routing query to softswitch 510 accordingly in step 6c. The configuring of terminating local telephone exchange switch 524 may involve setting up an Advanced Intelligent Network (AIN) trigger for the subscriber's device-shared telephone dialing number.

Softswitch 510 processes the call routing query of step 6c and identifies that the request relates to an incoming call to a device-shared telephone dialing services subscriber. Softswitch 510 thus requests that the call be redirected to it by transmitting a call redirection request to terminating local telephone exchange switch 524 in step 6d. Terminating local telephone exchange switch 524 responds to the redirect request of step 6d by redirecting the incoming call to softswitch 510 which results in a first incoming call connection request being transmitted from terminating local telephone exchange switch 524 to softswitch 510 in step 6e.

Once the call has been redirected to softswitch 510, softswitch 510 is then in control of the call. Softswitch 510 now proceeds to create call legs to each of the subscriber's telephony devices, in this case mobile phone 522 and analogue phone 526.

Before an outgoing call connection request can be sent to mobile phone 522, the location of mobile phone 522 must be determined. This is carried out by softswitch 510 transmitting a location query containing the device-shared telephone dialing number for the subscriber to HLR 512 in step 6f. HLR 512 then requests a Temporary Local Directory Number (TLDN) from serving MSC 514 in step 6g. Serving MSC 514 allocates a TLDN for the call and responds to HLR 512 accordingly in step 6h. HLR 512 then forwards the allocated TLDN to softswitch 510 in step 6i.

Softswitch 510 now transmits an outgoing call connection request to serving MSC 514 in step 6j. Serving MSC 514 sets up a call to mobile phone 522 in step 6k, which starts to ring accordingly (see item 602).

Softswitch 510 transmits a secondary call connection request to terminating local telephone exchange switch 524 in step 6l. Terminating local telephone exchange switch 524 has been configured to generate call routing queries for calls directed to the subscriber's telephone dialing number, and transmits a second call routing query to softswitch 510 in step 6m.

Softswitch 510 identifies the fact that it has received two call routing queries in association with the subscriber's device-shared telephone dialing number and notifies terminating local telephone exchange switch 524 accordingly in step 6n. Terminating local telephone exchange switch 524 then transmits an outgoing call connection request to analogue phone 526 in step 6o, which beings to ring (see item 604).

Both of the subscriber's telephony devices are now ringing, and depending on which telephone device the subscriber answers, an appropriate call connection procedure with calling party telephone 506 can be carried out as well as cancellation of the connection request to the telephony device that is not answered. Such steps will be clear to one skilled in the art in view of steps 2j to 2n in FIG. 2 or steps 4s to 4w in FIG. 4B.

In embodiments of the invention, the notification of step 6n may include data instructing terminating local telephone exchange switch 524 to make the outgoing call connection request of step 6o without generating a further call routing query for the call.

It should be noted that steps 6d and 6e in FIG. 6 are similar to steps 4d and 4e in FIG. 4A, although the former two steps will be sent according to a wireline protocol such as AIN or Intelligent Network Application Part (INAP), whereas the latter two steps will be sent according to a wireless protocol such as WIN or CAMEL. Further, steps 6f to 6i in FIG. 6 will be similar to steps 2d to 2g in FIG. 2.

In further embodiments of the invention to those depicted in FIGS. 2, 4A, 4B and 6, the subscriber may have more than two telephony devices on which they may be contacted, for example a mobile telephone, a SIP telephone and an analogue telephone. In such a case, once the softswitch has assumed control of the call, it can create three call legs, one to each of the three subscriber telephony devices. When one of the devices is answered, the other two call legs can be cancelled accordingly. The call flows for such further embodiments as well as those for more than three telephone devices will be clear to one skilled in the art in view of the description of FIGS. 2, 4A, 4B and 6 above.

Figure 7:
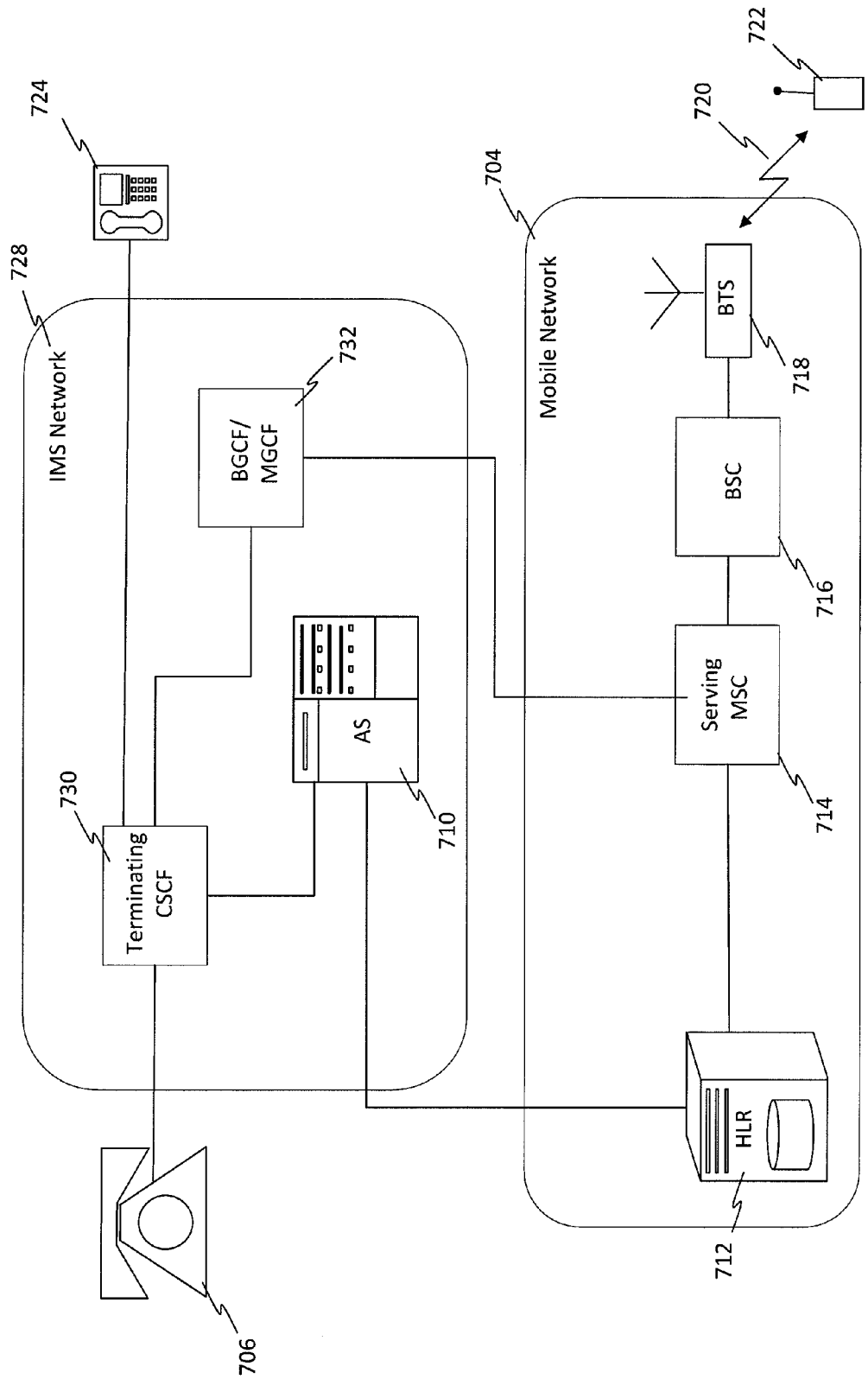
FIG. 7 shows a system diagram according to embodiments of the present invention.

FIG. 7 shows a system diagram according to embodiments of the present invention. FIG. 7 shows a telecommunications system with several components common to FIG. 1, namely SIP phone 724, mobile network 704, HLR 712, serving MSC 714, BSC 716, BTS 718, mobile telephone 722, radio interface 720, and calling party telephone 706.

FIG. 7 also includes an Internet Protocol Multimedia Subsystem (IMS) network 728, which is a network having an architecture developed by the 3GPP wireless standards body for providing both mobile and fixed multimedia services. FIG. 7 further includes a terminating Call Session Control Function (CSCF) 730 which includes one or more SIP proxies associated with the terminating subscriber's IMS network. These SIP proxies may include one or more of I-CSCF, S-CSCF and P-CSCF entities (Interrogating-, Serving-, and Proxy-CSCF respectively), whose function in the IMS architecture is known in the art and will not be described here in detail. Although shown as a single entity 730 in FIG. 7, such entities may in reality be separate and distributed entities in IMS network 728.

Entity 710 in FIG. 7 is a service platform which provides the main call processing and control functions (as per the softswitch in previous embodiments described above). Entity 710 is hereinafter referred to as an application server to accord with standard notation for an IMS architecture. Application server 710 interfaces with other IMS entities using SIP and has interconnectivity with HLR 712 in mobile network 704.

Entity 732 in FIG. 7 provides routing and interworking functionality between IMS network 728 and mobile network 704. Entity 732 includes a Breakout Gateway Control Function (BGCF), a Media Gateway Controller Function (MGCF), and a Media Gateway (MG), whose function in the IMS architecture is known in the art and will not be described here in detail. Although shown as a single entity 732 in FIG. 7, such entities may in reality be separate and distributed entities in IMS network 728.

The system of FIG. 7 may also include one or more other telephone exchange switches (not shown) located between calling party 706 and terminating CSCF 730, and/or between BGCF/MGCF 732 and serving MSC 714.

Embodiments of the invention may be implemented using the various entities depicted in FIG. 7. In these embodiments of the invention, calls to the subscriber's device-shared telephone dialing number are routed in the first instance to a terminating CSCF entity in the IMS network. The appropriate terminating CSCF entity in the IMS network is configured so that calls to the subscriber's device-shared telephone dialing number trigger an initial call connection request that is sent to a service platform (in IMS terminology referred to as an application server) at which the main call processing and control functions are carried out.

When a terminating call is received by the service platform, the service platform assumes control of the call and attempts to ring the subscriber's mobile phone. The service platform queries the subscriber's HLR using the device-shared telephone dialing number for the location of the subscriber's telephone which in turn contacts the subscriber's serving MSC. The response typically contains a temporary routing number, for example a Temporary Local Directory Number (TLDN. The service platform establishes a call to the temporary routing number via the terminating CSCF and BGCF/MGCF entities in the IMS network, resulting in the subscriber's mobile phone ringing.

The service platform also invokes appropriate procedures which result in the subscriber's other telephony devices ringing. For example, for a SIP-based device, the apparatus sends the device an Invite message via the terminating CSCF entity. As soon as one of the subscriber's telephony devices is answered, the apparatus connects the incoming call to the answered telephony device and cancels the calls to the subscriber's other telephony devices.

Figure 8:
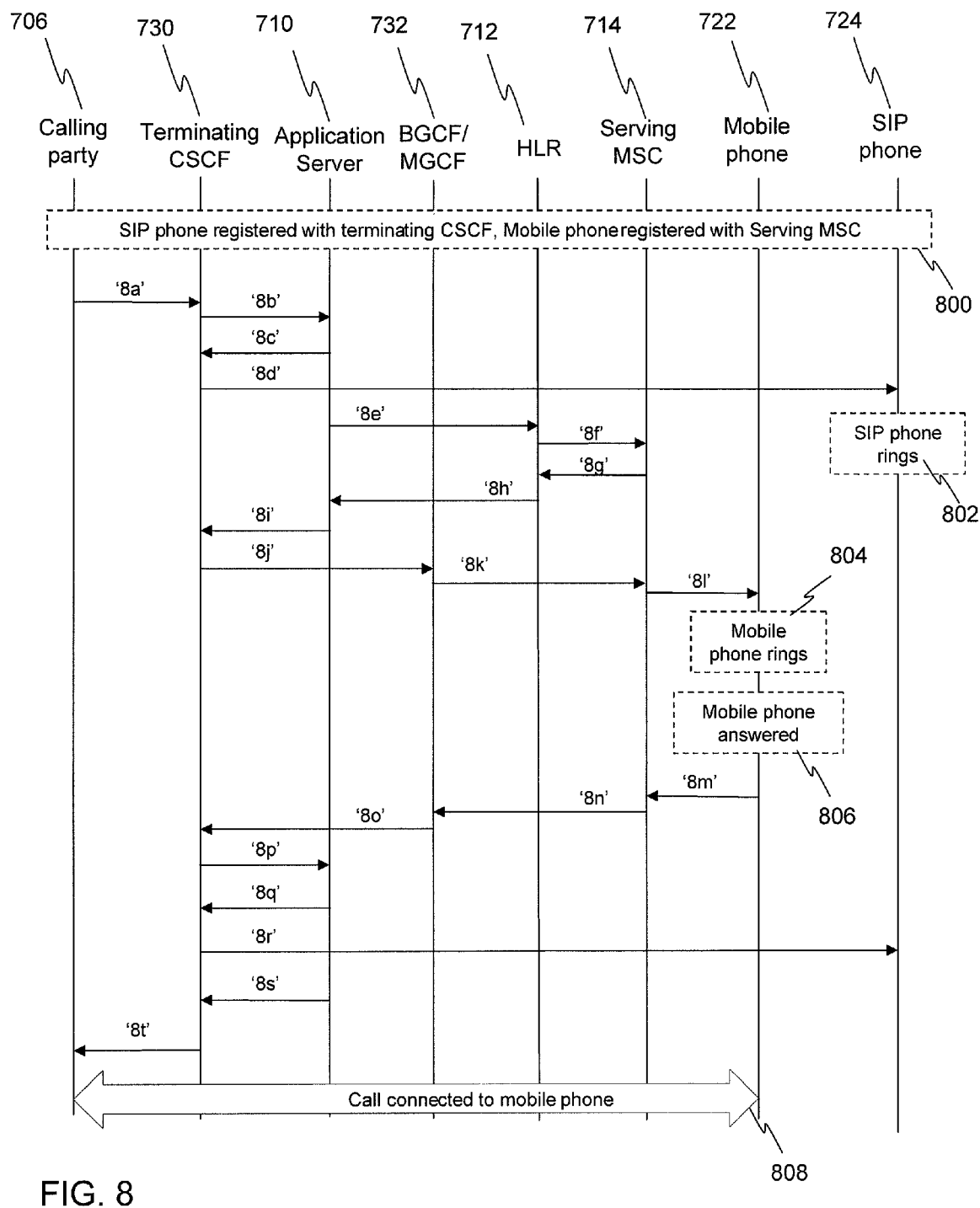
FIG. 8 is a flow diagram for a device-shared telephone dialing service according to an embodiment of the invention.

FIG. 8 is a flow diagram for a device-shared telephone dialing service according to an embodiment of the invention. In this embodiment the service platform which carries out the main call processing and control functions is application server 710 (denoted 'AS' in FIG. 7). In this embodiment, the subscriber has two telephony devices on which they may be contacted, namely mobile telephone 722 located in mobile network 704, and SIP telephone 724 located in IMS network 728.

Before the device-shared telephone dialing service is operational, the locations of SIP phone 724 and mobile phone 722 should be registered with certain network entities (see step 800).

SIP phone 724 registers its current location in IMS network 728 with application server 710, so that application server 710 knows how to direct incoming calls to SIP phone 724. This registration process may be carried out using SIP Register functionality where a SIP Register message is sent from SIP phone 724 to application server 710 containing data identifying the phone and where it can be located.

In this embodiment, registration takes place via terminating CSCF 730, although registration may occur directly between SIP phone 724 and application server 710. Registration may be carried out initially and then at periodic intervals subsequently. Application server 710 is thus able to use the register association to address SIP messages to SIP phone 724 via terminating CSCF 730. Alternatively, SIP phone 724 may register its location with a SIP Registrar network entity or SIP proxy server (not shown) which can be contacted by application server 710 to ascertain the location of SIP phone 724 in IMS network 728.

When mobile telephone 722 enters a cell served by serving MSC 714, it registers its current location with serving MSC 714. Serving MSC 714 will then update an appropriate visitor location register (VLR) (not shown) which may be remote from or may be incorporated into serving MSC 714. Serving MSC 714 then notifies HLR 712 of the location of mobile telephone 722 and also notifies the MSC/VLR serving the cell where mobile telephone 722 was previously located that mobile telephone 722 is no longer there.

Use of the device-shared telephone dialing service begins when a calling party wishes to make a call via their calling party telephone 706 to a subscriber to the device-shared telephone dialing service. In this embodiment, calling party telephone 706 is a SIP compliant telephone located in IMS network 728 and the subscriber has two telephones on which they may be contacted, namely mobile telephone 722 located in mobile network 704 and SIP telephone 724 located in IMS network 728.

The calling party dials the device-shared telephone dialing number for the subscriber which causes a first call setup request to be transmitted to terminating CSCF 730 which serves calling party telephone 706, as shown by step 8a. Terminating CSCF 730 has been configured to generate a first incoming call connection request for a call directed to the subscriber's telephone dialing number, which is transmitted to application server 710 in step 8b.

Configuration of terminating CSCF 730 is carried out according to filter criteria as defined in the 3GPP IMS specifications. In this case in particular, initial Filter Criteria (iFC) are invoked when a call directed to the subscriber's device-shared telephone dialing number is received such that the call is routed to application server 710.

Application server 710 processes the incoming call connection request of step 8b and identifies that the request relates to an incoming call to a device-shared telephone dialing services subscriber. Now that application server 710 is in control of the call, it proceeds to create call legs to each of the telephony devices of the subscriber; in this case mobile phone 722 and SIP phone 724.

A first outgoing call connection request is sent to SIP phone 724 in steps 8c and 8d in the form of a SIP Invite message sent via terminating CSCF 730 which contains data identifying the device-shared telephone dialing number for the subscriber. SIP phone 724 will then begin to ring (see item 802) and will typically respond by sending a SIP 180 Ringing message (not shown) back to application server 710 via terminating CSCF 730.

Terminating CSCF 730 is able to discriminate between the initial call connection request of step 8a and the first outgoing call connection request of step 8c from application server 710, for example by looking at the SIP headers of the respective messages. In particular, terminating CSCF 730 may monitor the SIP Route headers of the respective messages as defined in the 3GPP IMS specifications.

Before an outgoing call connection request can be sent to mobile phone 722, the location of mobile phone 722 must be determined. This is carried out by application server 710 transmitting a location query containing the device-shared telephone dialing number for the subscriber to HLR 712 in step 8e, for example in the form of a 'LOCREQ' message as per the ANSI-4 standard. HLR 712 then requests a Temporary Local Directory Number (TLDN) from serving MSC 714 in step 8f, for example in the form of a 'ROUTREQ' message as per the ANSI-4 standard. Serving MSC 714 allocates a TLDN for the call and responds to HLR 712 accordingly in step 8g. HLR 712 then forwards the allocated TLDN to application server 710 in step 8h.

Application server 710 now transmits a second outgoing call connection request to mobile phone 722 via terminating CSCF 730, BGCF/MGCF 732 and mobile serving MSC 714 in steps 8i to 8l.

Step 8i is a SIP Invite message directed towards the TLDN allocated to the call which is routed via terminating CSCF 730 and BGCF/MGCF 732. The role of the BGCF entity is to decide which MGCF entity to route the call via, although these are depicted as a combined entity in FIG. 8. The MGCF entity carries out any necessary protocol conversion such as converting the SIP Invite message of step 8j into an ISUP IAM message as per step 8k.

Serving MSC 714 sets up a call to mobile phone 722 in step 8l, which starts to ring accordingly (see item 804).

Both of the subscriber's telephony devices are now ringing, and in this case the subscriber answers mobile phone 722 (see item 806) which causes an answer message to be transmitted from mobile phone 722 to serving MSC 714 in step 8m. Serving MSC 714 informs application server 710 that mobile phone 722 has been answered by transmitting a call connection response via BGCF/MGCF 732 and terminating CSCF 730 in steps 8n to 8p. Here, the MGCF entity converts the ISUP Answer Message (ANM) of step 8n into a SIP 200 OK message as per step 8o.

SIP phone 724 was not answered by the subscriber, so softswitch cancels the outgoing call connection request to it, for example by transmitting a SIP Cancel message to SIP phone 724 via terminating CSCF 730 in steps 8q and 8r. In steps 8s and 8t, application server 710 connects a call between calling party 706 and mobile phone 722 and media data (for example voice data) may flow between the two devices (see item 808).

In alternative embodiments of the invention, the subscriber may have more than one SIP phone registered with terminating CSCF 730. In such embodiments, multiple outgoing call connection requests can be sent out by terminating CSCF 730, for example a single instance of SIP Invite message 8c resulting in multiple messages as per step 8d. Such a procedure is known as "SIP forking" and results in each of the SIP phones ringing. Depending on which phone is answered, appropriate call connection and call cancellation processes can be carried out by application server 710 and/or terminating CSCF 730.

The above embodiments are to be understood as illustrative examples. Further embodiments of the invention are envisaged.

If the subscriber's mobile telephone device is unavailable (e.g. powered off), the subscriber database response to a location query from a telephone switch or service platform will indicate that access is denied. In such a case the service platform cannot establish a connection to the Serving MSC but can continue to ring or create connections to the subscriber's other devices (for example SIP telephones or analogue telephones).

If neither phone is answered by the subscriber, the service platform can forward the call after a certain delay (for example to a Voicemail service). A similar procedure can be carried out if the one or more of the subscriber's telephony devices are engaged.

The system is able to function whether the subscriber's mobile telephone is roaming in another network. In such a case, the service platform can transmit a call connection request to the Serving MSC in the visited network, which may result in the call being routed via the PSTN.

The embodiments of the invention described above primarily apply to calls incoming to subscribers to one-telephone dialing number services. Outgoing calls originated from a subscriber's telephone may also be routed through the service platform, but this is not required since the CLI for the call typically already shows the desired value, namely the device-shared telephone dialing number of the subscriber. For example, a call originated from a subscriber's mobile device may be routed directly to the destination by the MSC currently serving the subscriber's mobile telephony device without the need for the service platform to be involved.

Several of the embodiments of the invention described above include a telephone which communicates using SIP as one of the subscriber's telephony devices. It is envisaged that the embodiments described herein also apply with other types of telephones, for example those which communicate using MGCP or H.248, or analogue telephones, etc.

Embodiments of the invention allow for transfer of calls between telephony devices. For example it may be useful for a subscriber to transfer a call they are currently conducting on their office SIP telephone to their mobile telephone if they wish to leave their office and continue the call.

So, assuming a call is already connected to the subscriber's SIP phone (which may have originated from the SIP phone or have been answered by the SIP phone), then the subscriber can initiate a call jump feature on their SIP phone. This is invoked using the SIP phone's call transfer mechanism where the target is an access code; the exact sequence of operations the subscriber must complete will depend upon the particular SIP phone. For example, some SIP phones permit one-touch call jump where a key is assigned to transfer a call to a pre-defined target. Some SIP phones support call transfer initiation using a SIP Refer message which will be routed to the service platform. When the service platform receives the Refer message, it initiates a call connection to the subscriber's mobile telephone, for example as in step 2d to 2i of FIG. 2. When the subscriber answers their mobile phone and the subscriber's SIP phone is placed on hook, the service platform connects the call to/from the other party to the subscriber's mobile phone, for example as per steps 2j to 2n in FIG. 2.

If the call is not successfully transferred to the subscriber's telephone, (for example because the call jump feature was accidentally invoked when the subscriber's mobile phone was powered off), the service platform may present the call again to the subscriber's SIP phone.

The actual flows involved in transferring calls according to embodiments of the invention will vary slightly according to how the SIP phone in question implements call transfer, which flows will be clear to one skilled in the art in view of the above description. Call transfer according to embodiments of the invention may also occur from a mobile phone to a SIP phone, and between other types of telephony devices.

In the case of call transfer from an analogue phone, call transfer can be initiated by use of 'Hook Flash' signalling that simulates the analogue phone quickly hanging up then picking up again. The call flows for this and other such call transfer embodiments of the invention will be clear to one skilled in the art in view of the above description.

Embodiments of the invention described above include one of the subscriber's telephony devices being a telephony device shared between a number of subscribers.

In embodiments where the shared telephony device is a SIP phone interfacing to a softswitch, (such as SIP phone 124 and softswitch 110 in FIG. 1, or SIP phone 324 and softswitch 310 in FIG. 3), the softswitch may request that the SIP phone alerts the subscriber in a manner particular to the subscriber. This may involve using a distinctive alerting pattern or indicator by including appropriate parameters in the outgoing call connection request. In particular, a SIP Alert-Info header included within the SIP Invite can be used for this purpose as defined in the SIP specifications.

In embodiments where the shared telephony device is an analogue phone interfacing to a terminating local telephone exchange switch, (such as analogue telephone 526 and terminating local telephone exchange switch in FIG. 5), the distinctive ringing service (also known as an alternate number or teen line service) is enabled on the terminating local exchange so that calls destined to any of the device-shared telephone numbers in the group ring the shared telephony device with the appropriate distinctive alerting pattern. Distinctive alerting according to the embodiments of the invention is also possible for other telephony devices and network arrangements, the particular arrangements and call flows for which will be clear to one skilled in the art in view of the above description.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of providing telephony services at a call control system to subscribers in a telecommunications system including a mobile telephone network and at least another telephone network different to the mobile telephone network, the mobile telephone network comprising a subscriber database, the call control system being located outside of the mobile telephone network, the subscribers each having a plurality of associated telephony devices including a mobile telephony device, all of the devices associated with a subscriber being contactable via a device-shared telephone dialing number, the method comprising:
receiving a first incoming call connection request associated with an incoming call directed to the device-shared telephone dialing number for a subscriber, the incoming call connection request having been routed to the call control system on the basis of the device-shared telephone dialing number;
assuming control of the incoming call;
transmitting a first outgoing call connection request to a first telephony device associated with the device-shared telephone dialing number, the first telephony device being located in the at least another telephone network;
transmitting a second outgoing call connection request to the mobile telephony device associated with the subscriber, the second outgoing call connection request being transmitted to the mobile telephony device based upon a location query and corresponding location response being sent to and received from respectively the subscriber database comprised in the mobile telephone network in relation to the device-shared telephone dialing number, the corresponding location response comprising a temporary routing number for the second outgoing call connection request;
receiving a call connection response from one of the first telephony device and the mobile telephony device; and
connecting the incoming call to the one of the first telephony device and the mobile telephony device.

2. The method of claim 1, comprising:
redirecting the incoming call to a service platform capable of transmitting the first and second outgoing call connection requests.

3. The method of claim 2, comprising:
receiving a first call routing query associated with the incoming call;
in response to receipt of the first call routing query, generating a call redirect request for the call to be redirected, wherein the incoming call is redirected in response to the generated call redirect request.

4. The method of claim 3, wherein:
the first call routing query is received from a telephone switch located in the telecommunications system;
the generated call redirect request is transmitted to the telephone switch; and
the call is redirected from the telephone switch.

5. The method of claim 4, comprising receiving at the telephone switch a primary call connection request associated with the incoming call directed to the device-shared telephone dialing number, wherein the first call routing query is generated by the telephone switch in response to receipt of the primary call connection request.

6. The method of claim 4, comprising configuring the telephone switch to generate a call routing query in response to receiving an incoming call that is directed to the device-shared telephone dialing number.

7. The method of claim 6, wherein the configuring comprises configuring the telephone switch to query the subscriber database for transmission data identifying where to transmit the call routing queries to.

8. The method of claim 6, wherein the configuring comprises configuring on the telephone switch for calls directed to the device-shared telephone dialing number one or more of:
an Intelligent Network (IN) trigger;
an Advanced Intelligent Network (AIN) trigger;
a Wireless Intelligent Network (WIN) trigger;
a Customised Applications for Mobile networks Enhanced Logic (CAMEL) trigger;
an Intelligent Network Application Part (INAP) trigger;
an initial Filter Criterion (iFC); and
a Local Number Portability trigger.

9. The method of claim 4, wherein:
the first call routing query is received by the service platform, the service platform being separate from the telephone switch in the telecommunications system;
the generated call redirect request is transmitted from the service platform; and
the incoming call is redirected to the service platform.

10. The method of claim 5, comprising, in response to the call redirection, creating a secondary call connection request directed to the device-shared telephone dialing number, whereby a second call routing query is generated by the telephone switch.

11. The method of claim 10, comprising:
identifying the first call routing query and the second call routing query as being associated with the same device-shared telephone dialing number; and
notifying the telephone switch of the identification.

12. The method of claim 11, wherein the location query is sent to the subscriber database in response to the notification step.

13. The method of claim 11, wherein the first outgoing call connection request is transmitted to the first telephony device in response to the notification step.

14. The method of claim 11, wherein the identification and notification steps are carried out at the service platform and the notification comprises instructing the telephone switch to carry out the location query and transmit the second outgoing call connection request to the mobile telephony device without generating a further call routing query.

15. The method of claim 11, wherein the identification and notification steps are carried out at the service platform and the notification comprises instructing the telephone switch to transmit the first outgoing call connection request to the first telephony device without generating a further call routing query.

16. The method of claim 11, wherein the identification step comprises one or more of:
   monitoring redirection information associated with the incoming call,
   monitoring call routing queries associated with the incoming call,
   monitoring incoming call connection requests associated with the incoming call,
   monitoring information associated with the calling party for the incoming call, and
   monitoring information associated with the called party for the incoming call.

17. The method of claim 1, comprising receiving an initial call connection request associated with the incoming call directed to the device-shared telephone dialing number, wherein the first incoming call connection request is generated in response to receipt of the initial call connection request.

18. The method of claim 17, wherein:
   the initial call connection request is received at a telephone switch located in the telecommunications system, and
   the first incoming call connection request is transmitted from the telephone switch.

19. The method of claim 18, wherein:
   the first incoming call connection request is received by a service platform separate from the telephone switch in the telecommunications system; and
   the first and second outgoing call connection requests are transmitted from the service platform.

20. The method of claim 1, wherein the first telephony device is located in a different network to the mobile telephone network in the telecommunications system, the different network comprising:
   a public switched telephone network;
   an Internet Protocol Multimedia Subsystem network; or
   an Internet Protocol data network.

21. The method of claim 1, wherein the first telephony device comprises a Session Initiation Protocol telephony device, and the transmittal of the first outgoing call connection request to the first telephony device comprises transmitting a Session Initiation Protocol Invite message to the first telephony device.

22. The method of claim 21, comprising:
   redirecting the incoming call to a service platform capable of transmitting the first and second outgoing call connection requests; and
   registering the location of the Session Initiation Protocol telephony device with the service platform, whereby the service platform ascertains a network address of the Session Initiation Protocol telephony device to transmit the first outgoing call connection request to.

23. The method of claim 1, comprising:
   in response to receiving the call connection response from the one of the first telephony device and the mobile telephony device, cancelling the outgoing call connection request to the other of the first telephony device and the mobile telephony device.

24. The method of claim 4, wherein the telephone switch comprises one of:
   a mobile switching centre located in a mobile telephone network in the telecommunications system;
   a local wireline telephone exchange switch located in a public switched telephone network in the telecommunications system; and
   a Call Session Control Function entity located in an IP Multimedia Subsystem network in the telecommunications system.

25. The method of claim 1, wherein the first telephony device is a shared telephony device associated with multiple subscribers,
   wherein the first outgoing call connection request causes the first telephony device to alert the subscriber associated with the first telephony device and the mobile telephony device in a manner particular to the subscriber.

26. The method of claim 1, comprising:
   in response to the transmittal of the first outgoing call connection request, receiving a call transfer request from the first telephony device,
   wherein the second outgoing call connection request is transmitted to the mobile telephony device in response to receipt of the call transfer request,
   wherein the call connection response is received from the mobile telephony device, and
   wherein the connecting step comprises transferring the incoming call from the first telephony device to the mobile telephony device.

27. A method of providing telephony services to subscribers in a telecommunications system including a mobile telephone network and at least another telephone network different to the mobile telephone network, the mobile telephone network comprising a subscriber database, the call control system being located outside of the mobile telephone network, the subscribers each having an associated telephone dialing number and a plurality of associated telephony devices including a mobile telephony device, all of the devices associated with a subscriber being contactable via a device-shared telephone dialing number, the method comprising:
   receiving an incoming call connection request associated with an incoming call directed to the device-shared telephone dialing number for a subscriber;
   in response to receipt of the incoming call connection request, connecting the incoming call to one of a first telephony device and a mobile telephony device associated with the subscriber;
   receiving a call transfer request from the telephony device to which the incoming call was connected to;
   in response to receipt of the call transfer request, transmitting an outgoing call connection request to the other of the first telephony device and the mobile telephony device;
   receiving a call connection response from the telephony device to which the outgoing call connection request was transmitted; and
   transferring the incoming call to the telephony device from which the call connection response was received from,
   wherein if the outgoing call connection request is transmitted to the mobile telephony device, the outgoing call connection request is based upon a location query being sent to the subscriber database in relation to the device shared telephone dialing number.

28. A non-transitory computer-readable medium having computer-executable instructions stored thereon, which, when executed, cause a computing device to perform a method of providing telephony services at a call control system to subscribers in a telecommunications system including a mobile telephone network and at least another telephone network different to the mobile telephone network, the mobile telephone network comprising a subscriber database, the call control system being located outside of the mobile telephone network, the subscribers each having a plurality of associated telephony devices including a mobile telephony device, all of the devices associated with a subscriber being contactable via a device-shared telephone dialing number, the method comprising:

receiving a first incoming call connection request associated with an incoming call directed to the device-shared telephone dialing number for a subscriber, the incoming call connection request having been routed to the call control system on the basis of the device-shared telephone dialing number;

assuming control of the incoming call;

transmitting a first outgoing call connection request to a first telephony device associated with the device-shared telephone dialing number, the first telephony device being located in the at least another telephone network;

transmitting a second outgoing call connection request to the mobile telephony device associated with the subscriber, the second outgoing call connection request being transmitted to the mobile telephony device based upon a location query and corresponding location response being sent to and received from respectively the subscriber database comprised in the mobile telephone network in relation to the device-shared telephone dialing number, the corresponding location response comprising a temporary routing number for the second outgoing call connection request;

receiving a call connection response from one of the first telephony device and the mobile telephony device; and connecting the incoming call to the one of the first telephony device and the mobile telephony device.

\* \* \* \* \*